(12) United States Patent
Tarahomi et al.

(10) Patent No.: US 6,758,507 B2
(45) Date of Patent: Jul. 6, 2004

(54) ENERGY ABSORBING EXTERNAL COMPONENT FOR VEHICLE

(75) Inventors: Sassan Tarahomi, Brighton, MI (US); William G. Hofmann, Grosse Point Park, MI (US)

(73) Assignee: Venture Industries, Fraser, MI (US)

( * ) Notice: Subject to any disclaimer, the term of this patent is extended or adjusted under 35 U.S.C. 154(b) by 27 days.

(21) Appl. No.: 09/997,670

(22) Filed: Nov. 29, 2001

(65) Prior Publication Data

US 2002/0121787 A1 Sep. 5, 2002

Related U.S. Application Data

(63) Continuation-in-part of application No. 09/797,275, filed on Mar. 1, 2001, now abandoned.

(51) Int. Cl.$^7$ ............................................. B60R 19/22
(52) U.S. Cl. ..................................... 293/120; 293/109
(58) Field of Search ............................. 293/109, 120, 293/121, 122, 136

(56) References Cited

U.S. PATENT DOCUMENTS

| | | | |
|---|---|---|---|
| 3,744,835 A | 7/1973 | Carbone et al. ............... 293/1 |
| 3,871,636 A | 3/1975 | Boyle ......................... 267/140 |
| 3,997,207 A | 12/1976 | Norlin ....................... 293/71 R |
| 4,022,505 A | 5/1977 | Saczawa, Jr. .............. 293/71 R |
| 4,029,350 A | 6/1977 | Goupy et al. ............. 293/71 R |
| 4,106,804 A | * 8/1978 | Scrivo ........................ 293/121 |
| 4,186,915 A | 2/1980 | Zeller et al. ................ 267/140 |
| 4,265,688 A | 5/1981 | Gorski |
| 4,320,913 A | * 3/1982 | Kuroda .................... 293/122 X |
| 4,366,885 A | * 1/1983 | Vrijburg ................. 293/121 X |
| 5,022,943 A | 6/1991 | Zaima |
| 5,306,066 A | 4/1994 | Saathoff .................. 296/146.6 |
| 5,306,068 A | 4/1994 | Nakae et al. .............. 296/189 |
| 5,326,615 A | 7/1994 | Tsuchihashi et al. |
| 5,356,177 A | 10/1994 | Weller ........................ 280/751 |
| 5,425,561 A | 6/1995 | Morgan ..................... 293/120 |
| 5,435,619 A | 7/1995 | Nakae et al. ............... 296/189 |
| 5,536,344 A | 7/1996 | van Dreumel |
| 5,575,500 A | 11/1996 | Mimura et al. |
| 5,593,182 A | 1/1997 | Frost ......................... 280/751 |
| 5,609,385 A | 3/1997 | Daniel et al. |
| 5,649,721 A | 7/1997 | Stafford et al. ............. 280/751 |
| 5,683,782 A | 11/1997 | Duchene |
| 5,720,510 A | 2/1998 | Daniel et al. |
| 5,743,983 A | 4/1998 | Ogata et al. |
| 5,746,419 A | 5/1998 | McFadden et al. ......... 267/140 |
| 5,799,991 A | * 9/1998 | Glance ....................... 293/109 |
| 5,806,889 A | 9/1998 | Suzuki et al. |
| 5,849,122 A | 12/1998 | Kenmochi et al. |
| 5,927,778 A | 7/1999 | Uytterhaeghe et al. ..... 293/120 |
| 6,012,764 A | 1/2000 | Seksaria et al. |
| 6,017,084 A | 1/2000 | Carroll, III et al. ......... 296/189 |
| 6,050,631 A | 4/2000 | Suzuki et al. |
| 6,126,231 A | 10/2000 | Suzuki et al. |
| 6,145,908 A | 11/2000 | Deb et al. |
| 6,164,709 A | * 12/2000 | Kuczynski et al. ......... 293/109 |
| 6,199,942 B1 | 3/2001 | Carroll, III et al. |
| 6,264,454 B1 | * 7/2001 | Hale .......................... 425/89 |
| 6,299,238 B1 | 10/2001 | Takagi et al. |
| 6,334,639 B1 | * 1/2002 | Vives et al. ................ 293/133 |
| 6,547,295 B2 | * 4/2003 | Vismara ..................... 293/133 |
| 2001/0042988 A1 | 11/2001 | Kobayashi |

FOREIGN PATENT DOCUMENTS

| | | | |
|---|---|---|---|
| DE | 1923305 | * 10/1970 | ................ 293/122 |
| EP | 0 676 315 A1 | 11/1995 | |

* cited by examiner

Primary Examiner—Dennis H. Pedder
(74) Attorney, Agent, or Firm—Welsh & Katz, Ltd.

(57) ABSTRACT

A bumper system includes an elongated beam configured to be operatively mounted to the frame of the vehicle. Also included is a foam portion that extends along a portion of the beam and a fascia surrounding the foam portion. The fascia and the foam portion are operatively attached to the beam. The foam portion has a plurality of recesses formed therein which extend through a predetermined thickness of an inside portion of the foam portion. An integrated cylindrical cell matrix is disposed with the recesses and is configured to absorb energy resulting from impact force applied to an external portion of the bumper.

19 Claims, 26 Drawing Sheets

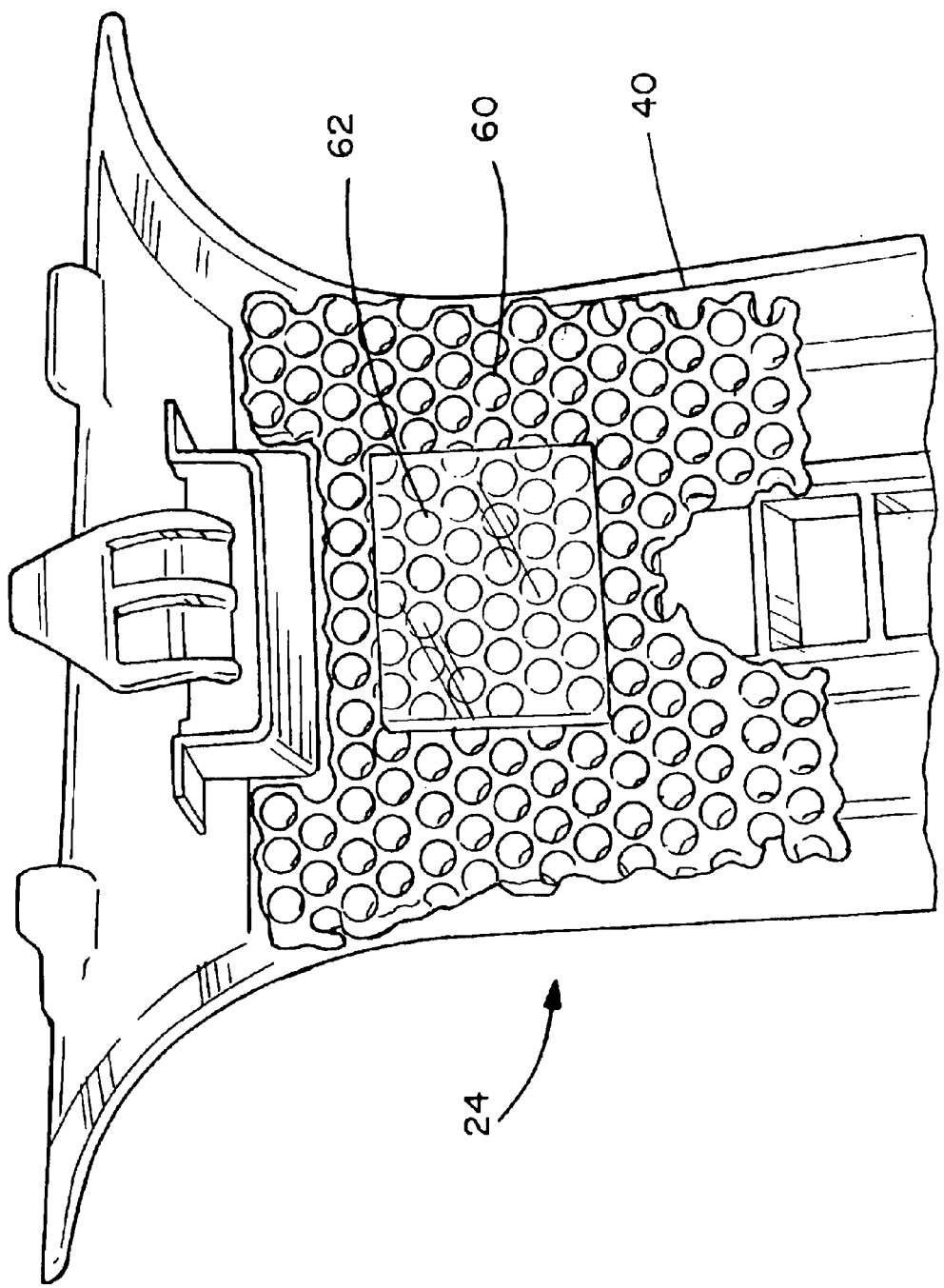

ENERGY ABSORBING EXTERNAL COMPONENT FOR VEHICLE

CROSS-REFERENCE TO RELATED APPLICATIONS

This patent application is a continuation-in-part of and claims the benefit of priority from patent application Ser. No. 09/797,275, filed on Mar. 1, 2001, now abandoned entitled Automobile Interior Components That Satisfy Impact Standards And A Method For Manufacturing The Same.

FIELD OF THE INVENTION

The present invention generally relates to automobile exterior components, and more particularly, to an external component of a vehicle, such as a vehicle bumper, having energy absorbing structures disposed therein.

BACKGROUND

U.S. Pat. No. 5,683,782 discloses a process for producing a thermoplastic sandwich material that includes a cylindrical cell structure. Referring to FIG. 1 of U.S. Pat. No. 5,683,782, a greatly enlarged sectional representation of a honeycomb segment with a cover layer is shown. In accordance with the invention disclosed in this patent, a thermoplastic sandwich material is made from two outer reinforced thermoplastic skins with a cellular core at the center that is molded by a thermo-compression process. The skins are formed from polypropylene with continuous glass mats, or are formed by woven glass with polypropylene fibers. The content of U.S. Pat. No. 5,683,782 is incorporated by reference into this application as if fully set forth herein.

Thermoplastic sandwich materials, such as those disclosed in U.S. Pat. No. 5,683,782, have been utilized in a variety of different applications. For example, U.S. patent application Ser. No. 09/451,970, filed Nov. 30, 1999 discloses a method for molding an impact resistant automotive part, such as a bumper beam. A thermoplastic reinforced fiber structure at least partially forms a pair of attachment portions of the automotive part and continuously extends between the attachment portions to link the attachment portions. The content of the U.S. Ser. No. 09/451,970 patent application is incorporated by reference into this application as if fully set forth herein.

In another example, U.S. patent application Ser. No. 09/445,356, filed Dec. 10, 1999 discloses a method of making a composite panel that has a sandwich structure and that is provided with a hinge. The panel comprises a stack that includes at least a first skin of a reinforced thermoplastic material and a second skin of a thermoplastic material. The panel is formed by preheating the first and second skins to a softening temperature, and then pressing the stack of skins at a pressure that lies in a predetermined range. The content of the Ser. No. 09/445,356 patent application is incorporated by referenced into this application as if fully set forth herein.

Yet another exemplary use of thermoplastic sandwich material is disclosed in U.S. patent application Ser. No. 09/485,142, filed Feb. 4, 2000. This application discloses a method of making a reinforced composite panel of the sandwich type having a cellular-core. The content of the Ser. No. 09/485,142 application is incorporated by reference into this application as if fully set forth herein.

U.S. patent application Ser. No. 09/525,346, filed Mar. 15, 2000 discloses the utilization of thermoplastic sandwich material in a certain application. In particular, this application discloses a method and system for co-molding a thermoplastic material with a thermoplastic sandwich material to form a thermoplastic sandwich article. The article has a thermoplastic inner portion. The content of patent application Ser. No. 09/525,346 is incorporated by reference into this application as if fully set forth herein.

U.S. patent application entitled "Method and System For Molding Thermoplastic Sandwich Material and Deep-Drawn Article Produced Thereby," filed Mar. 15, 2000 discloses a method and system for molding a thermoplastic sandwich material to form a deep-drawn article. In particular, an inner portion of a blank of thermoplastic sandwich material is forced into a female die along a vertical axis to form a deep-drawn article. A step of clamping may be performed at a plurality of spaced outer portions of the blank immediately adjacent the female die. The content of the above-referenced "Method and System" patent application is incorporated by reference into this application as if filly set forth herein.

As discussed above, thermoplastic sandwich materials are being used in a variety of different automobile applications. It should be noted that typical automobiles have a hard steel frame body which forms the skeleton of the car. The hard steel frame body is designed to meet various strength requirements necessary to protect the vehicle occupant from injury in a collision. To provide the interior of the car with an aesthetically pleasing appearance, automobiles are designed with interior components such as a dashboard, pillars, headliners, consoles and the like.

In the event of a vehicle collision, an occupant may be injured if he or she comes into contact with the automobile interior component that typically is rigidly connected to the hard frame body inside of the vehicle. To protect the occupant from the hard frame structure, a number of governmental regulations regarding safety requirements, such as the head impact collision requirement FMUSS201, have been promulgated. A number of automobile interior components that currently are on the market do not satisfy these requirements.

Various regulations also mandate that external components of the vehicle, such as the bumper, meet impact requirements with respect to the damage incurred under controlled collisions. In one specific test, the vehicle is driven into a fixed seven inch diameter pole at five miles per hour to assess damage to the bumper. Alternately, the vehicle may remain stationary and a pendulum may impact the vehicle bumper. In that regard, various known bumper systems have been proposed. U.S. Pat. No. 3,744,835 discloses a shock absorbing honeycomb cell bumper, which is constructed from plastic and is covered by a rubber shell. Such a construction, however, is difficult to work with and is fairly expensive to implement because the entire bumper is formed of the honeycomb cell material.

With respect to impact absorption, the weight of the vehicle is a significant factor. Some known bumper systems use a low-density foam between the bumper fascia and the bumper bar. Foam works for its intended purpose but as requirements become more stringent and as the weight of the vehicle increases, some manufactures have used foam of a higher density in an attempt to meet the impact requirements. However, use of higher density foams has not appeared to enable manufactures to meet the above-mentioned impact test. Additionally, use of higher density foam increases the manufacturing cost, and also increases the overall weight of the bumper.

It is desirable to provide an energy-absorbing bumper that is cost-effective, light-weight and absorbs energy during a collision without damage, and permits impact tests to be met.

SUMMARY

The disadvantages of present bumper systems are substantially overcome with the present invention. More specifically, the bumper system according to one embodiment of the present invention includes an elongated beam configured to be operatively mounted to the frame of the vehicle. Also included is a foam portion that extends along a portion of the beam, and a fascia surrounding the foam portion. The fascia and the foam portion are operatively attached to the beam. The foam portion has a plurality of recesses formed therein which extend through a predetermined thickness of an inside portion of the foam portion. An integrated cylindrical cell matrix is disposed with the recesses and is configured to absorb energy resulting from impact force applied to an external portion of the bumper.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

The objects and advantages of the present invention will become more readily apparent to those of ordinary skill in the relevant art after reviewing the following detailed description and accompanying drawings, wherein:

FIG. 4 is a rear view of the B pillar component illustrating cylindrical cell structures;

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
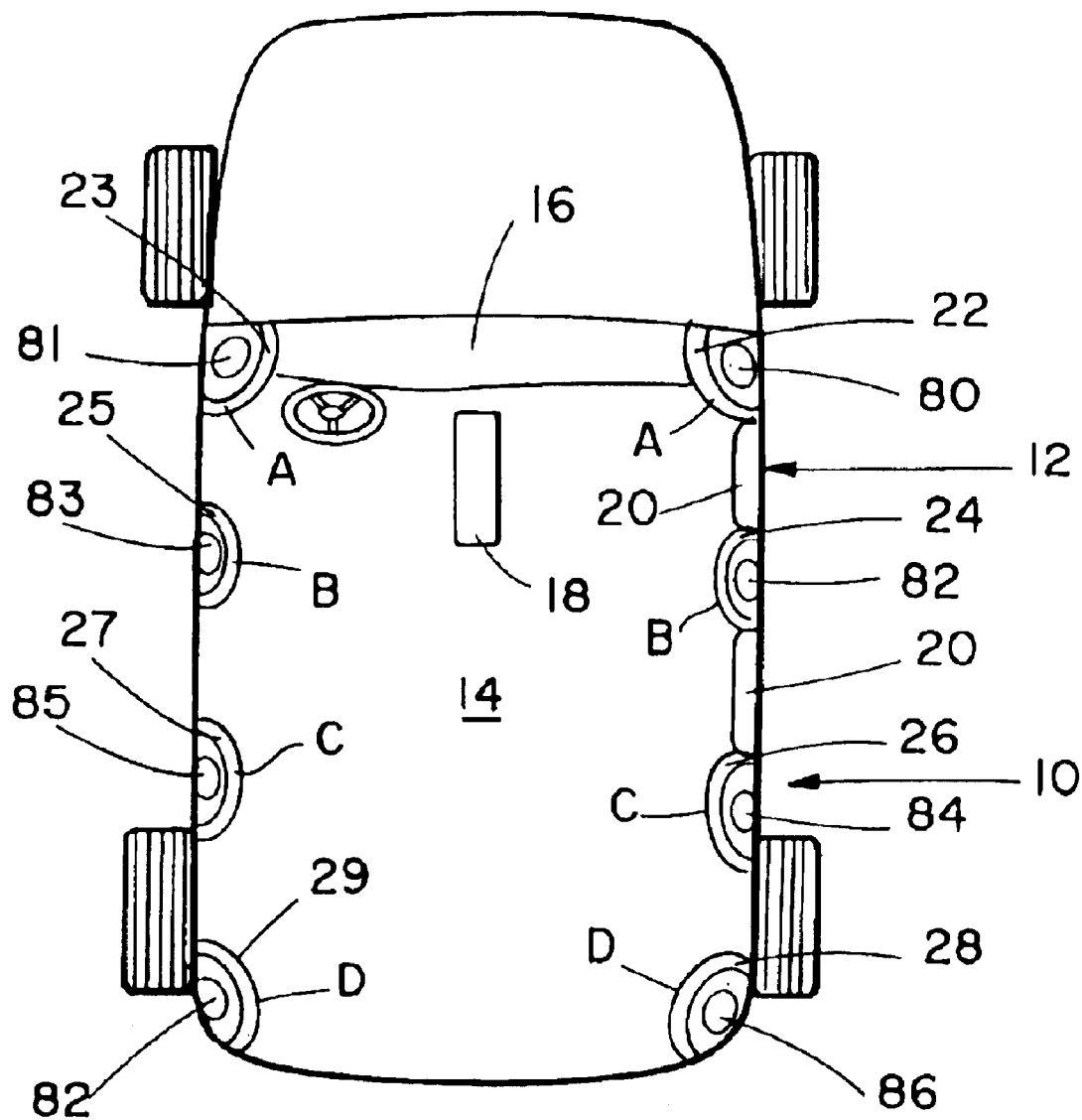
FIG. 1 is a pictorial representation of a top view of a van that illustrates a number of automobile interior components.

Referring now to FIG. 1, there is shown a schematic representation of a van 10 having a frame body 12. The frame body 12 includes upright portions 80–87, which extend from the main portion of the frame body 12 to a roof portion (not shown). The frame body 12 defines an interior 14 in which various automobile interior components are mounted. In the illustrated embodiment of the invention, interior 14 includes a dashboard 16, an interior console 18, side paneling 20, and pillars 22–29. It also should be understood that the present invention is applicable in other automotive applications such as, for example, in a headliner application (not shown). In the illustrated embodiment, four sets of pillars (A, B, C, and D) are shown. The pillars are mounted to cover the corresponding uprights 80–87 of the frame body 12.

The A, B, C, and D pillars are coupled to corresponding upright portions of the frame body 12. The A pillars are coupled to a corresponding first upright portion 80 and 81. The B pillars are coupled to corresponding second upright portions 82 and 83 that are located in a mid-portion of the vehicle, behind the front-side window. The C pillars are coupled to corresponding third upright portions 84 and 85 that are located behind the B pillar, near the rear portion of the vehicle. The D pillars are coupled to corresponding fourth upright portions 86 and 87 at the rear of the van. It should be understood that the number uprights (and pillars) vary in accordance with the general size of the vehicle.

Figure 2:
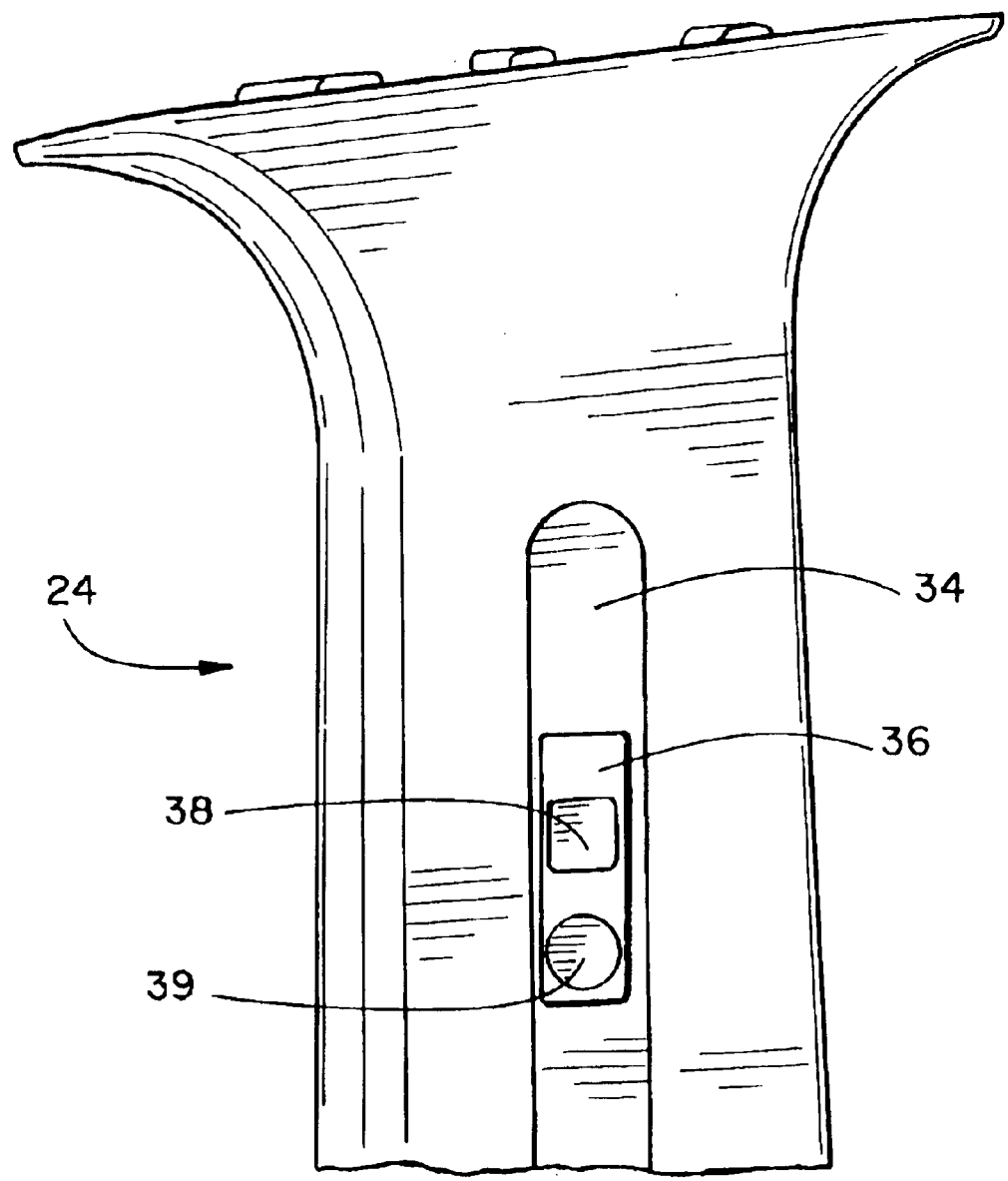
FIG. 2 is a front view of the B pillar component shown in FIG. 1.

Referring to FIG. 2, a front view of the B pillar 24 (FIG. 1) is shown. The B pillar 24 includes a sliding mechanism 34 that is configured to receive a shoulder strap from a seat belt assembly (not shown). The sliding mechanism 34 has a movable slot 36 with plural holes 38 and 39 defined therein. In the illustrated embodiment of the invention, the sliding mechanism 34 is in operative connection to the B pillar 24 and slidably moves with respect to the B pillar 24. By manipulating the mechanism 34, the orientation of the seatbelt with respect to the B pillar 24 is varied into several positions.

Figure 3:
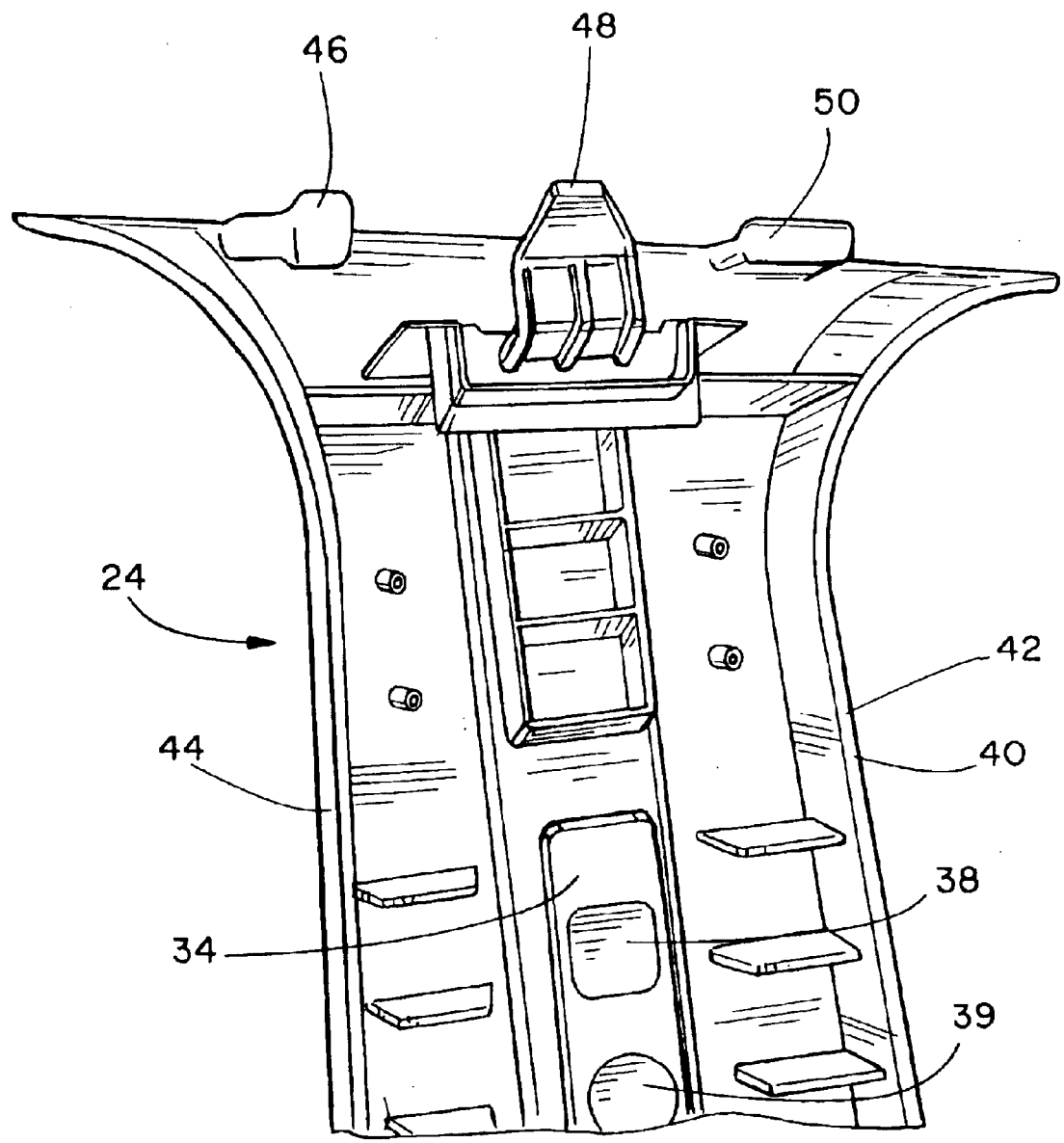
FIG. 3 is a rear view of the B pillar component shown in FIGS. 1 and 2.

Referring now to FIG. 3, a reverse side view of the B pillar 24 showing an adjacent interior shell portion 40 is shown. As shown, interior shell portion 40 is configured to receive a cylindrical cell structure or like resilient material as discussed in greater detail hereafter to allow the B pillar to satisfy certain safety requirements such as, for example, head impact requirements. The B pillar 24 has adjacent dual mounting surfaces 42 and 44. Sliding mechanism 34 is disposed between the dual mounting surfaces 42 and 44. The pillar 24 includes fasteners 46, 48, and 50 that are used to securely snap the pillar 24 into flush connection with the van frame body's upright portion (not shown).

Referring now to FIG. 4, a rear side view of B pillar 24 is shown. Cylindrical cell structures 60 and 62 are affixed to the adjacent interior shell portion 40 of B pillar 24 after the B pillar 24 is formed. The cylindrical cell structures may be referred to as a cylindrical cell matrix or insert or an integrated cylindrical cell matrix or insert. In accordance with this aspect of the invention, a mechanical means such as, for example, a gluing or press-fit technique is used to establish the connection.

In the illustrated embodiment of the invention, cylindrical cell structures 60 and 62 are glued together to form one unitary structure. However, it should be understood that the cylindrical cell structures 60 and 62 also can be formed in a one-piece configuration. In the illustrated embodiment of the invention, the cylindrical cell structure 60 is configured to be mounted on the B pillar 24 and a corresponding section of the automobile frame to allow the B pillar 24 to meet certain safety requirements such as, for example, head impact collision requirements as discussed in greater detail hereafter.

In the illustrated embodiment of the invention, one surface of the cylindrical cell member 60 is mechanically affixed or glued to the interior mounting face 40 of the B pillar 24. When the B pillar 24 is fastened to the vehicular frame, the exterior surface of cylindrical cell structures 60 and 62 are placed in contact with the corresponding upright portion of the vehicle. Thus, a unitary connection is established between the upright portion of the vehicle, the cylindrical cell structures 60 and 62, and the B pillar 24. The cylindrical cell structures 60 and 62 thereby provide the B pillar with certain physical characteristics so as to satisfy certain safety standards such as, for example, head impact collision standards.

The shape and configuration of the cylindrical cell structures 60 and 62 are determined in accordance with the shape of the exterior shell portion 40 of the B pillar 24 to which they are affixed. As shown in FIG. 4, the cylindrical cell structures 60 and 62 are affixed flush upon the inside of the mounting surface and spans the general width of the mounting surface 40.

Figure 5A:
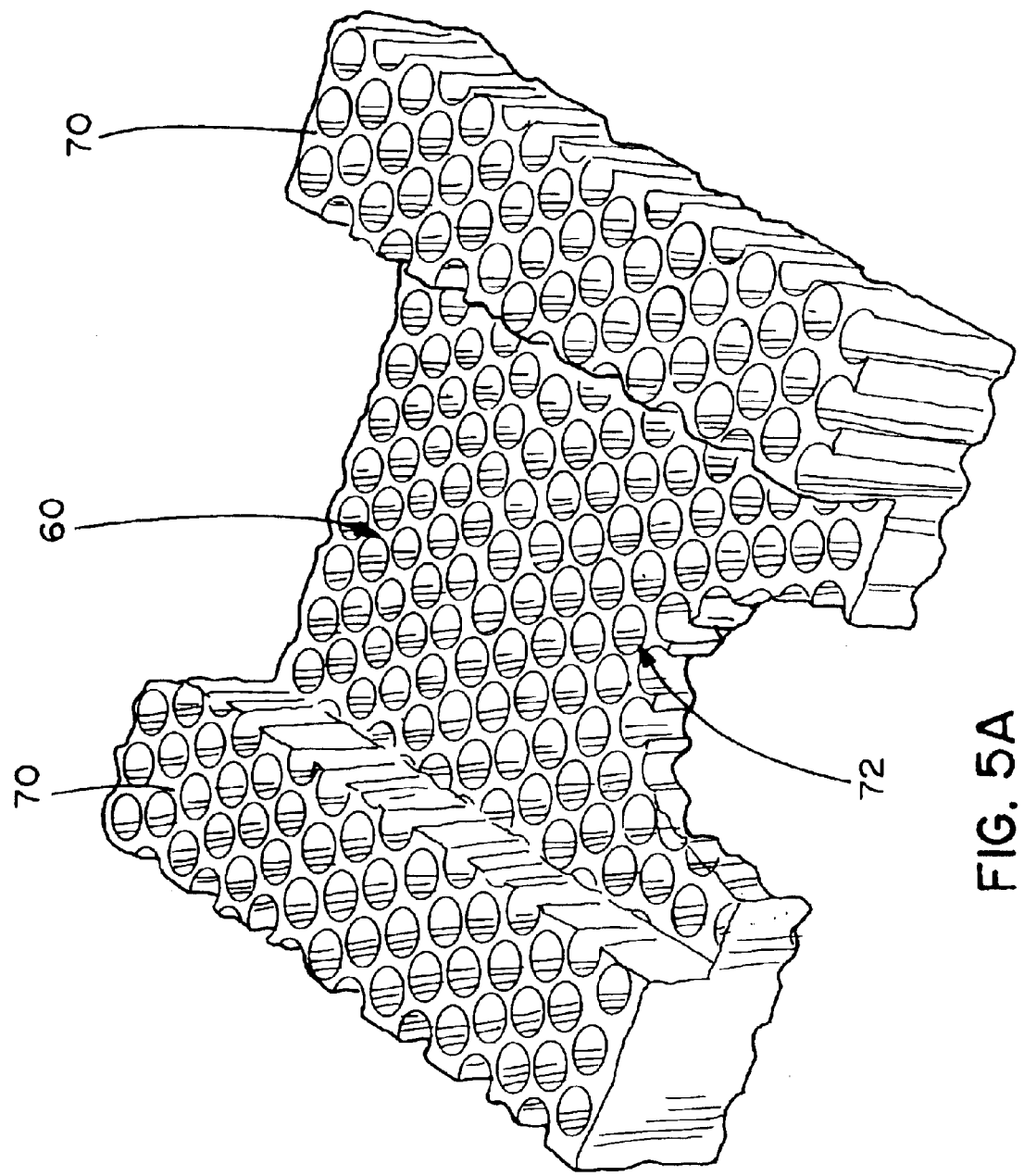
FIG. 5A is a bottom, perspective view of cylindrical cell structures.

Referring to FIG. 5A, a bottom, perspective view of cylindrical cell structure 60 is shown. In the illustrated embodiment of the invention, the bottom surface of the cylindrical cell structure 60 that is affixed to the B-pillar 24 includes a channel 72 that allows the sliding mechanism of the seat belt assembly (not shown) to be moved by the occupant of a vehicle without resistance. Cylindrical cell structure 60 also includes two mounting portions 70 that are affixed to the mounting surfaces 42 and 44 that are defined on B pillar 24 (FIG. 3). It should be understood that, in accordance with the teachings of the present invention, the shape of bottom surface of cylindrical cell structure 60 is defined in accordance with the type of automobile interior component that is being used, as well as any other automobile components that are located in close proximity to the cylindrical cell structure such as air conditioning ducts, electrical conduits, and the like.

Figure 5B:
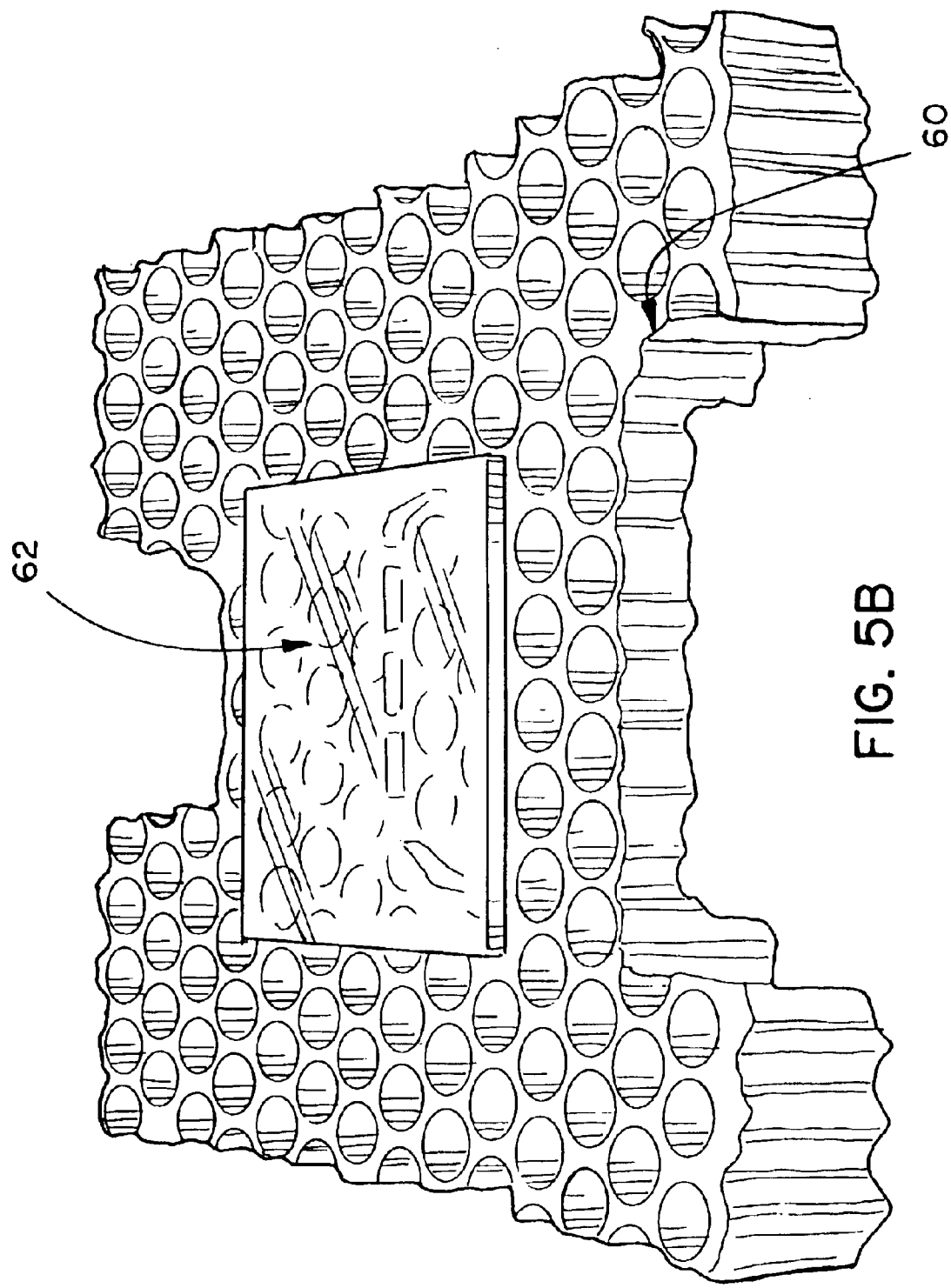
FIG. 5B is a top, perspective view of the cylindrical cell structures shown in FIG. 4.

Referring to FIG. 5B, a top, perspective view of the cylindrical cell structures 60 and 62 are shown. In the illustrated embodiment of the present invention, the upper surfaces of cylindrical cell structures 60 and 62 generally correspond to the portion of the automobile frame to which they are connected so that the surface area of contact therebetween is generally maximized.

Various methods for manufacturing automobile interior parts by insert molding are disclosed, for example, in U.S. Pat. Nos. 6,180,207, 6,132,662 and 6,158,764. In accordance with certain teachings of these patents, a plastic pre-form part is inserted into a mold cavity of an injection mold. Thereafter, a thermoplastic elastomer or molten resin is injected into the mold cavity of the injection mold to generate a substrate of the pre-form part. The resulting part is cooled and removed from the mold. The contents of the above-referenced patents are incorporated by reference into this application as if fully set forth herein.

Figure 6:
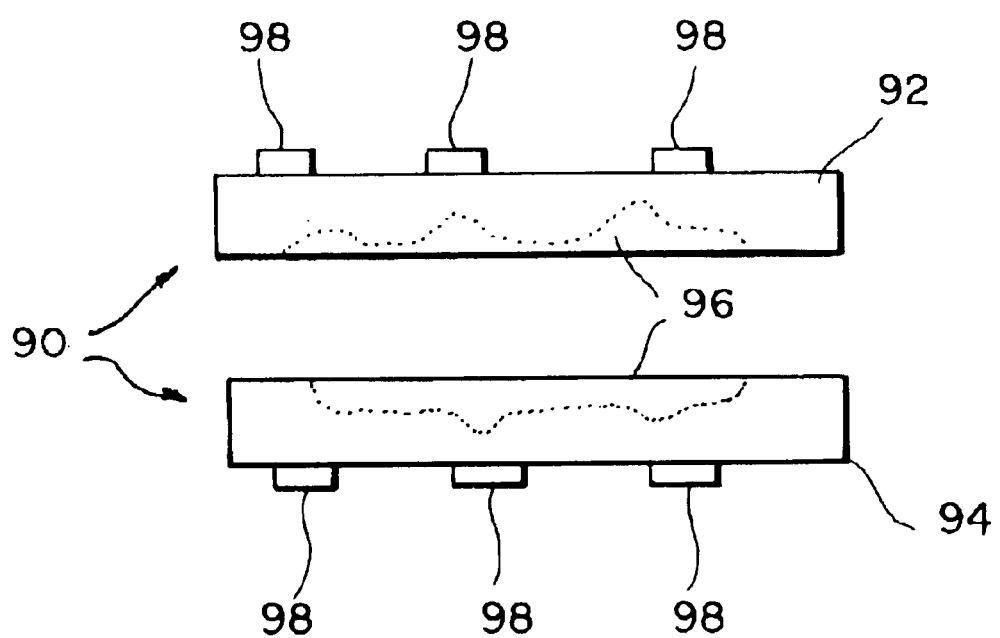
FIG. 6 is a side, schematic view of a mold used to form automobile interior components.

FIG. 6 is a side view of a exemplary mold 90 that is suitable for use in connection with aspects of the present invention disclosed herein. In particular, mold 90 can be utilized to manufacture automobile interior components that satisfy certain safety requirements such as, for example, head impact collision requirements. In accordance with this aspect of the present invention, a cylindrical cell structure is inserted into the article defining cavity of a mold during the molding process. For example, mold 90 is used to manufacture automobile interior components such as, for example, B pillar 24 that is shown in FIG. 1. Also, for example, the cylindrical cell structure is formed to have a desired shape as discussed above with reference to FIGS. 1–5B. However, it should be understood that mold 90 can be used to manufacture any type of automobile interior component desired.

In the illustrated embodiment of the invention, mold 90 forms a portion of an insert molding apparatus. In this regard, mold 90 includes first and second mold halves 92 and 94 that are movable with respect to each other between open and closed positions. When the mold 90 is in a closed position, an article defining cavity 96 is defined between the mold halves 92 and 94 as shown in FIG. 6. The shape of the article defining cavity 96 corresponds to the automobile interior component that is to be manufactured. Mold 90 includes a number of heating units 98 that are used to heat the moldable material that is contained in the article defining cavity 96 during portions of the molding process.

In the illustrated embodiment of the invention, an insert molding process is used to form automobile interior components by the following steps. First, a cylindrical cell structure having a desired shape is provided. In one example, the cylindrical cell structure can be shaped in accordance with the shape of the cylindrical cell structures 60 and 62 that are described above with regard to FIGS. 1–5. Second, the cylindrical cell structure is positioned at a predetermined position on one of the mold halves 92 and 94. This position corresponds to the location on an automobile interior component that is to be manufactured at which a cylindrical cell structure is to be located. Positioning the cylindrical cell structure in this manner allows the automobile interior component to satisfy safety standards as discussed above.

Third, a predetermined amount of a thermoplastic resin, elastomer, or like material is injected into the article defining cavity 96. This causes an automobile interior component to be formed around the cylindrical cell structure. After the insert molding process is completed, the cylindrical cell structure is integrally bonded to the automobile interior component. The, the automobile interior component/cylindrical cell structure assembly is removed from the mold 90.

Figure 7A:
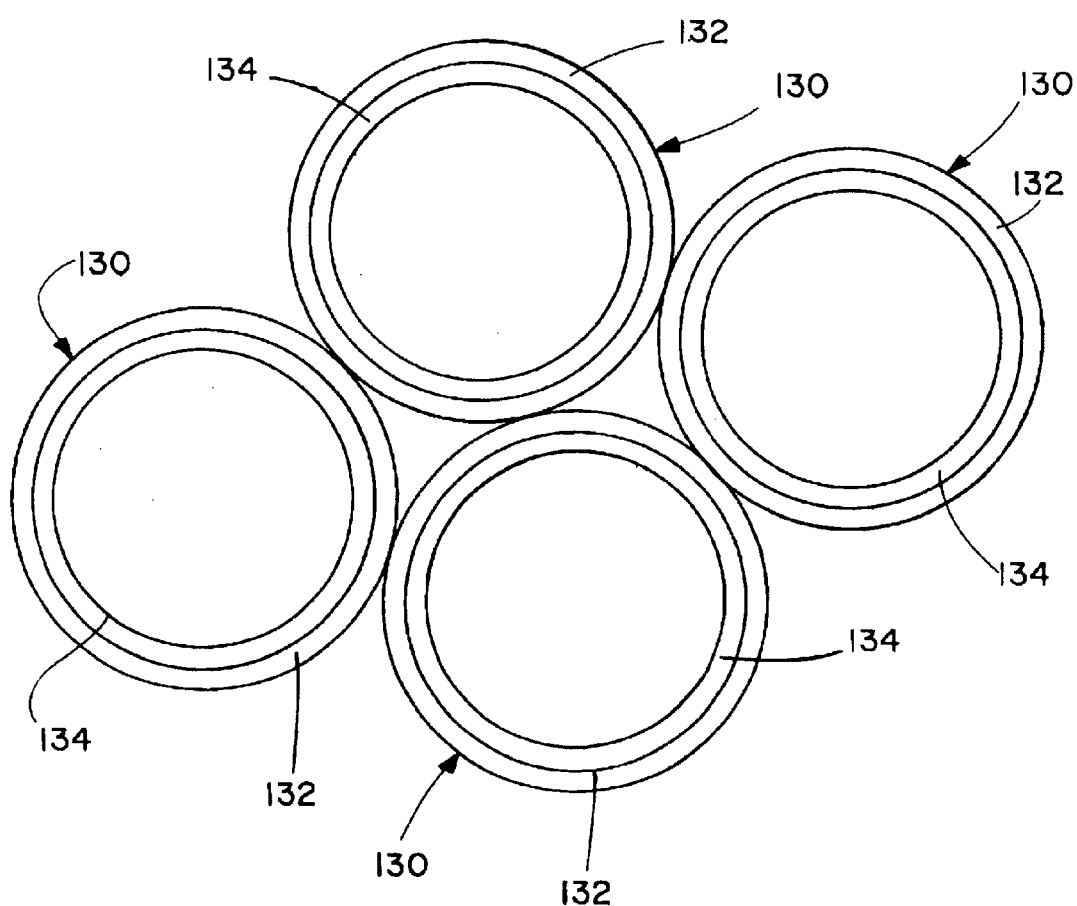
FIG. 7A is a top view of a plurality of separate straw members that are indexed into a shape defining cavity of a mold.

Discussed hereafter with regard to FIGS. 7A–10 is a method for forming a cylindrical cell structure with a desired shape. Referring to FIG. 7A, a top view of a plurality of separate straw members 130 that are indexed into a shape defining cavity of a mold are shown. Each straw member 130 comprises a central core 134 that is formed from a first thermoplastic material that has a relatively high melting point. An outer layer of a second thermoplastic material 132 surrounds each central core 134 and has a relatively low melting point to allow a plurality of straw members 130 to be joined together and a desired cylindrical cell structure to be manufactured as discussed in greater detail hereafter.

Figure 7B:
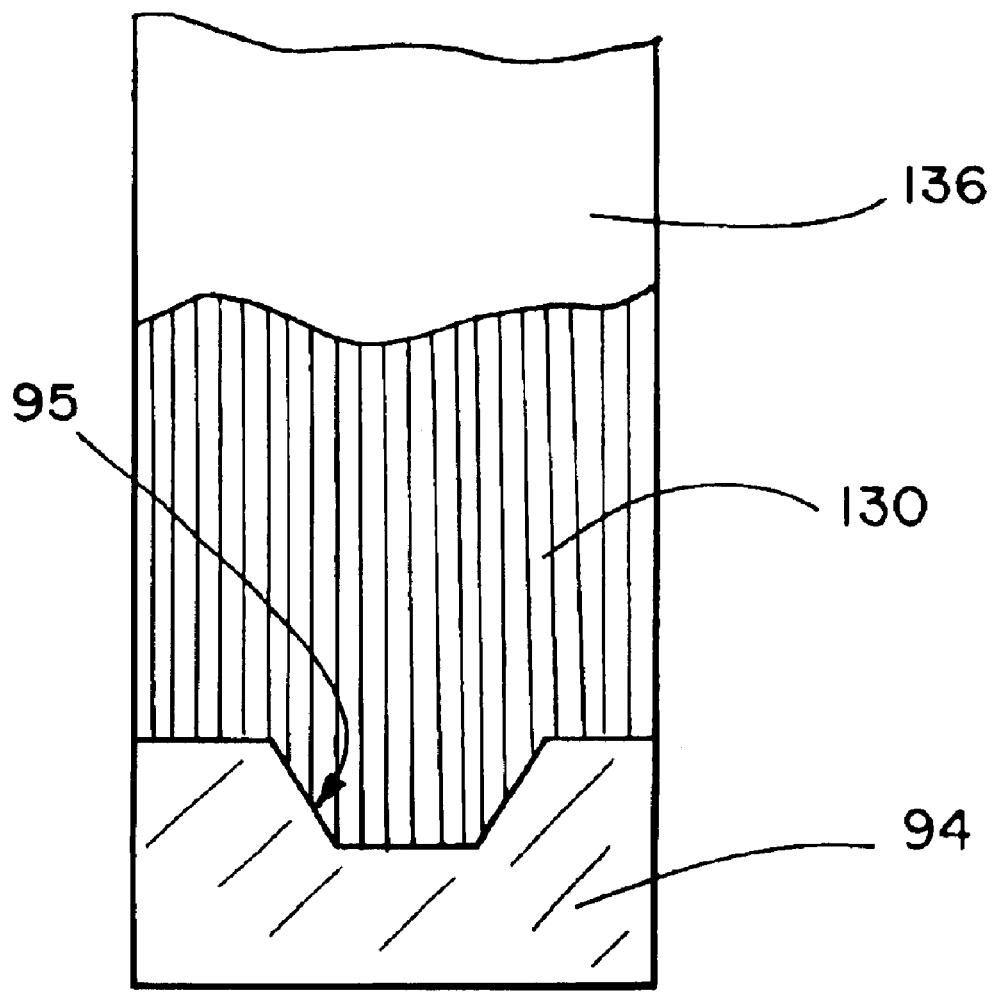
FIG. 7B is a sectional view of a mold half that includes a shape defining cavity in which a plurality of straws are disposed.
Figure 7C:
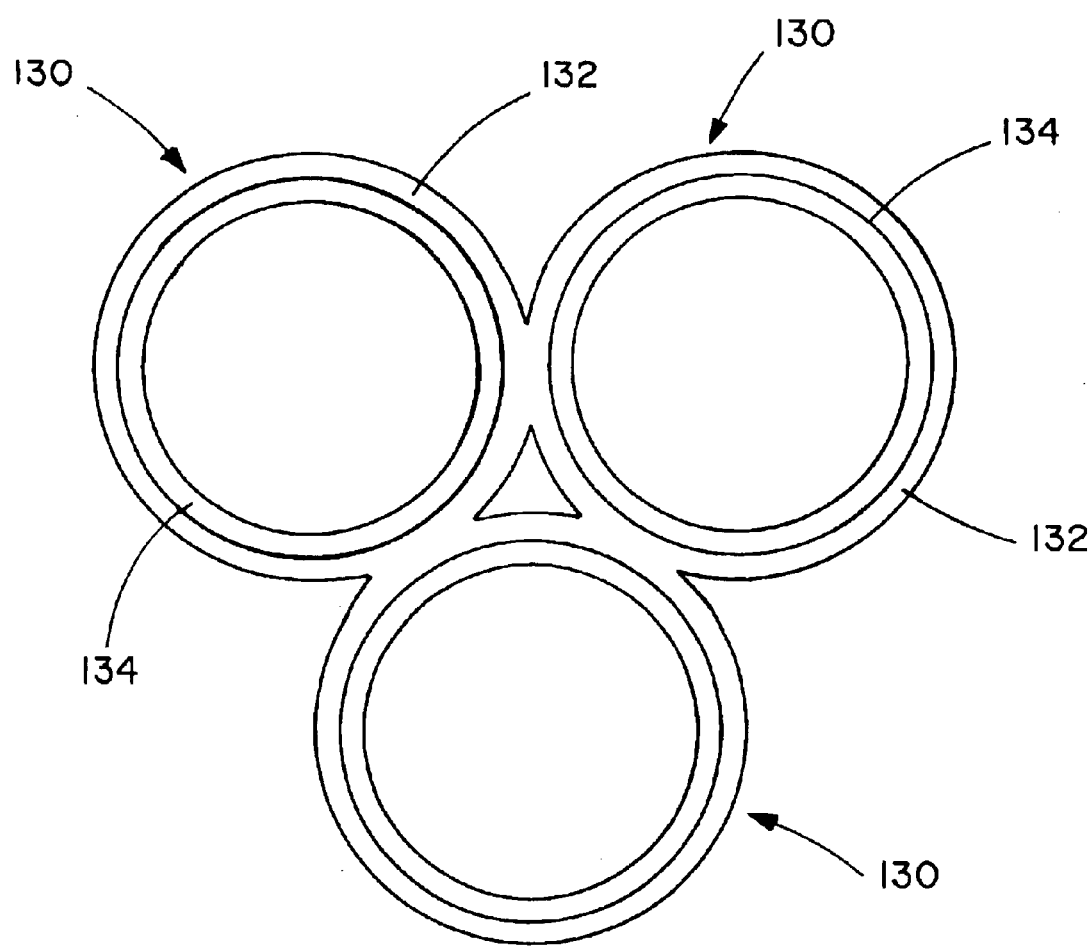
FIG. 7C is top view of a plurality of straw members that have been bonded together to form a unitary structure.

Referring to FIG. 7B, sectional view of a mold half 94 that includes a shape defining cavity 95 in which a plurality of straws 130 are disposed is shown. The shape of the article defining cavity 95 generally corresponds to the desired shape of one side of the cylindrical cell structure that is to be formed and affixed to an automobile interior component to enable it to satisfy safety requirements such as, for example, head impact collision standards. The straw members 130 are contained in a holding fixture 136 that allows the straw members 130 to be indexed into general flush contact with the mold half 94 and shape defining cavity 95.

To form one side of the cylindrical cell structure 60, the mold half 94 is heated to a predetermined temperature, high enough to melt the low temperature material of the straw members outer layer 132, but low enough so as not to melt the high temperature material of the straw members inner core 134. Melting the low temperature outer core 132 in such a manner forms a bond between the straw members after they are cooled. As one example, referring to FIG. 7C, a top view of a plurality of straw members 130 that have been bonded together to form a unitary structure is shown. Note that the cylindrical cell structure or matrix 60 has superior stress management properties then polygonal shaped structures, such as hexagonal shaped or honeycomb-type members. The cylindrical straw member 130 tends to more evenly distribute the impact stresses more evenly around its circumference, as opposed to polygonal shaped cells, which tend to receive concentrated loads at the vertices.

Figure 8:
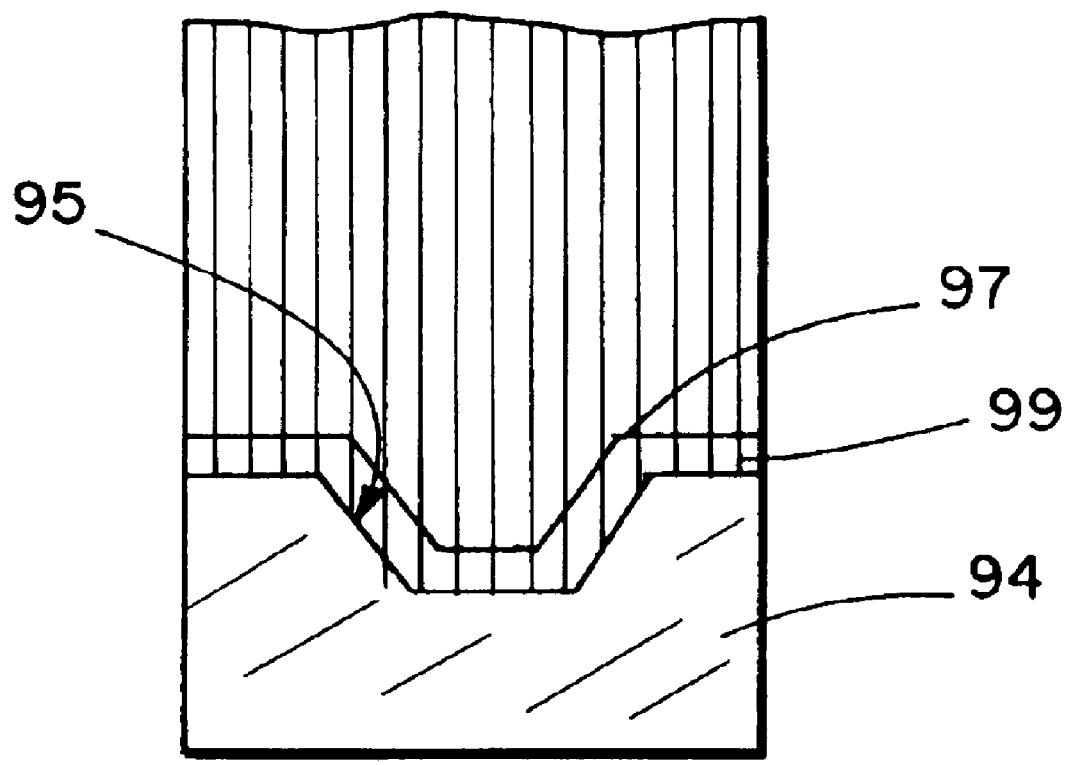
FIG. 8 is a sectional view of a mold half showing a cut line that allows a cylindrical cell structure to be formed.
Figure 9:
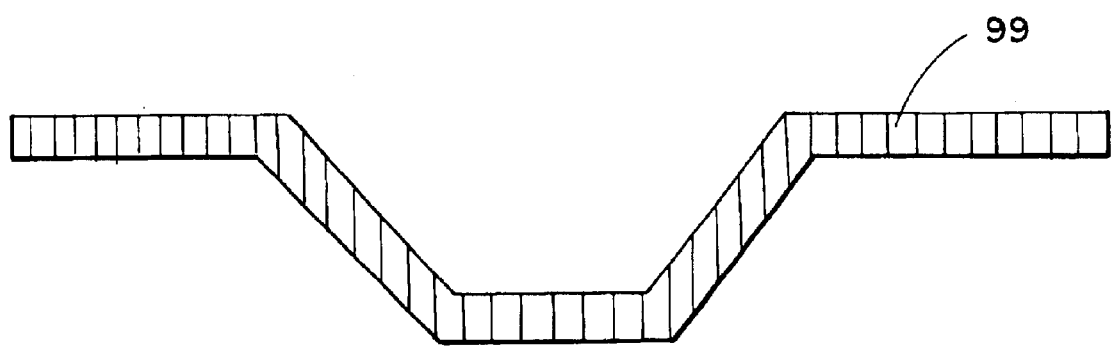
FIG. 9 is a section view of the cylindrical cell structure shown in FIG. 8.

Referring to FIG. 8, a sectional view of a mold half 94, similar to FIG. 7B, showing a cut line 97 through a plurality of indexed straws is shown. This allows a cylindrical cell structure 99 to be formed, a sectional view of which is shown in FIG. 9. In particular, a cutting utensil, such as a hot knife, hot piano wire or the like, is used to make the cut along line 97 to allow cylindrical cell structure 99 to be formed. In the illustrated embodiment of the invention, the shape of the cut line generally corresponds to the surface contour of the shape defining cavity 97. This allows, for example, material waste of the bonded straw members 130 to be significantly reduced.

It should be understood that the method for forming a cylindrical cell structure discussed above with regard to FIGS. 7A–9 is adaptable to be utilized in an in-line manufacturing process for manufacturing automobile interior components. For example, a robot could be utilized to move a formed cylindrical cell structure from mold half 94 (FIG. 8) to an injection mold apparatus (not shown) that would allow the cylindrical cell structure to be bonded to an automobile interior component as it is formed.

Figure 10:
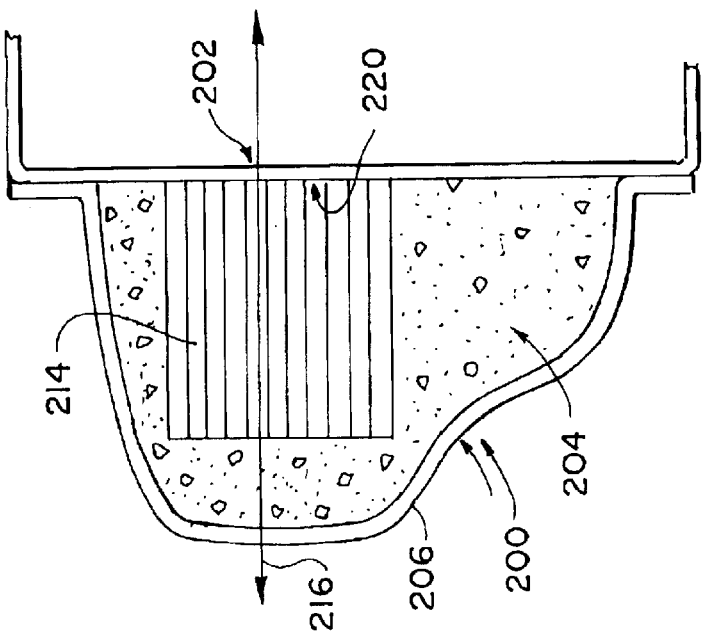
FIG. 10 is a cross-sectional view of a specific embodiment of an energy-absorbing bumper.
Figure 11:
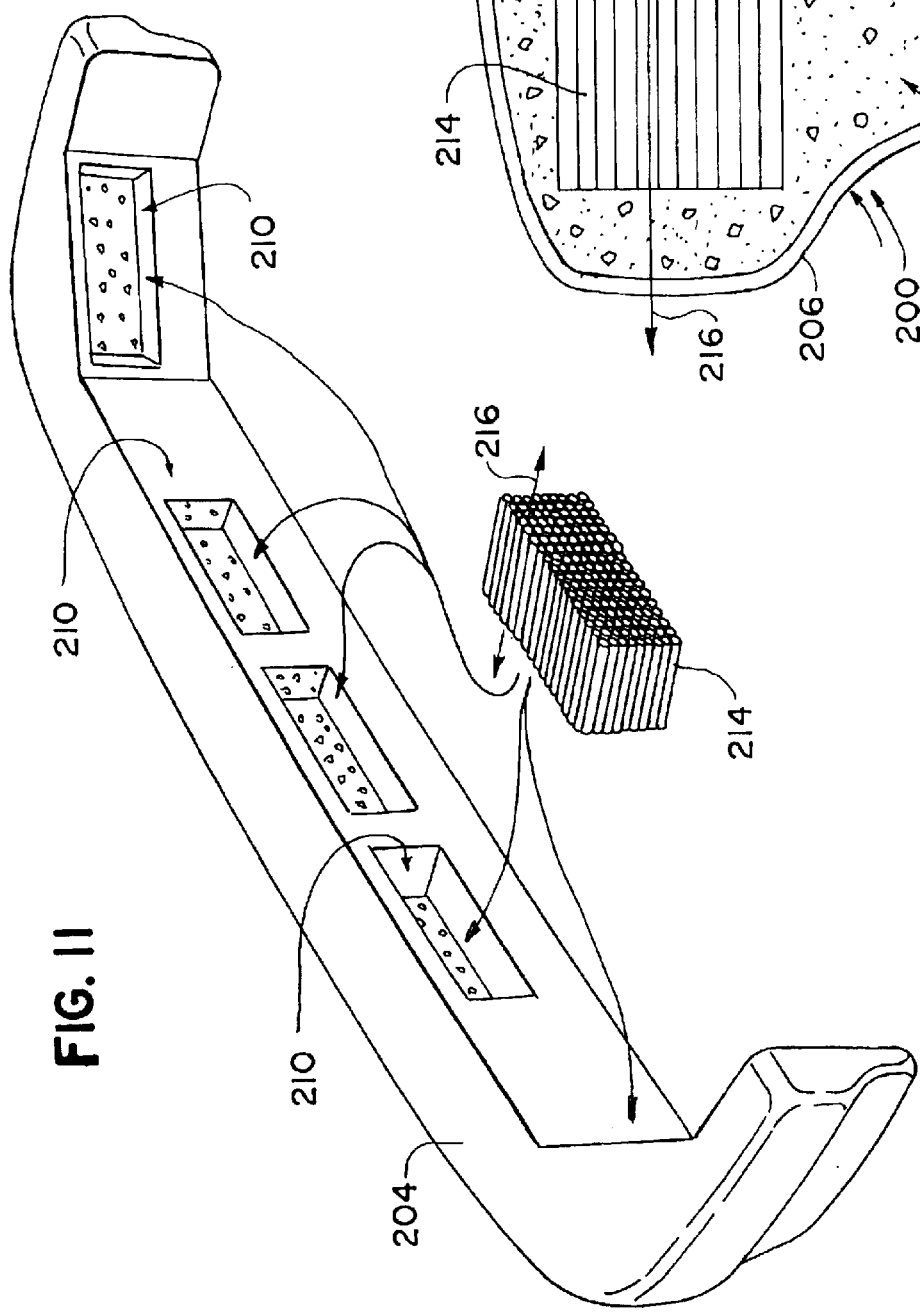
FIG. 11 is a perspective view of a specific embodiment of a foam portion and cylindrical cell matrix of an energy-absorbing bumper.

Referring now to FIGS. 10 and 11, a specific embodiment of an energy absorbing bumper system 200 is shown generally in FIG. 10. The bumper 200 is typically mounted on the frame of a vehicle (not shown) by mechanical means, such as brackets, bolts, and the like, as is known in the art. The bumper system 200 includes an elongated beam 202, which may be formed of metal or composite material, and which may be stamped or rolled, as is known in the art. The beam 202 extends along a portion of the width of the vehicle.

A molded foam portion 204 extends laterally over a portion of the beam 202 and fills a portion of the volume of the bumper 200 defined by a fascia 206 (FIG. 10) and the beam. The fascia 206 surrounds the foam and is part decorative and part structural. The fascia 206 and the foam portion 204 are operatively attached to the beam via bonding or brackets, as is known in the art. For purposes of illustration only, the fascia 206 is not shown in FIG. 11.

Preferably, the foam portion 204 is formed of ethylene-propylene polymer (EPP foam), which may be available under the trade name of EPERAN propylene. Such foam is preferably low-density foam, but any suitable propylene energy absorbing foam may be used, as is known in the art. The EPP foam, for example, may have a density of about between two pounds per cubic foot and eight pounds per cubit foot.

The foam portion 204 includes a plurality of recesses 210 formed therein, as best shown in FIG. 11, which recesses extend through a predetermined depth of the foam portion. An integrated cylindrical cell matrix 214 may be disposed within each recess 210, and is configured to absorb energy resulting from physical impact applied to the bumper. Note that some recesses may not receive the cylindrical cell matrix 214, as described below. Absorption of a sufficient amount of energy permits the fascia 206 to remain undamaged in the relevant low-speed impact tests. Note that the cylindrical cell matrix 214 is of the same construction as the cylindrical cell matrix 60 and 62 shown in FIGS. 4, 5A, and 5B, and as discussed above, may be formed or molded into a shape appropriate for insertion into the recesses 210.

As mentioned above, some known bumpers are constructed entirely using low-density foam to fill the space defined by the fascia. To meet particular impact test requirements, and in part, because predictive analysis of such bumper systems is unreliable, some manufactures have "over-designed" the bumper to pass the impact tests. Because it is difficult to predict the effect of a design change with respect to impact testing, such over-designed bumpers, while perhaps meeting some test requirements, are unnecessarily expensive. This is undesirable in such a cost-competitive industry.

With respect to the present invention, strategic placement of the cylindrical cell matrix 214 permits the bumper system 200 to pass certain impact tests. Use of the cylindrical cell matrix 214 reduces damage to the bumper by absorbing a sufficient amount of energy such that the fascia 206 will not be damaged. Replacement of the fascia 206 is particularly expensive and may necessitate replacement of the entire bumper. Even if the bumper system 200 sustains some damage in an impact (for example, in an impact exceeding the parameters of the government mandated tests), in some situations, only the cylindrical cell matrix 214 may have sustained damage, rather than the fascia 206. In this situation, the cylindrical cell matrix 214 may be replaced upon disassembly of the bumper system 200. This may significantly reduce the cost of repair.

In operation, an impact against the bumper system 200 initially contacts the fascia 206. This caused the fascia 206 to deform and exert force against the foam portion 204. Further compressive force then reaches the cylindrical cell matrix 214, which absorbs sufficient energy so as to prevent damage to the fascia 206. Of course, if the impact is sufficiently strong, all components may sustain damage. However, the present bumper system 200 can handle a greater amount of impact force without sustaining fascia damage than known bumpers having only foam body portions.

Generally, the cylindrical cell matrix 214 absorbs the greatest amount of energy along a longitudinal axis 216 of the matrix. Similarly, the bumper system 200 absorbs the greatest amount of energy from impacts directed along the longitudinal axis 200, but impacts directed at other angles are also contemplated.

As shown in FIG. 11, the recesses 210 do not extend through the entire thickness of the foam portion 204. Rather, the recesses 210 preferably extend only through the foam portion 204 for a distance of about between forty percent to ninety percent of the thickness of the foam portion. Of course, where the thickness of the foam portion 204 is reduced, such as toward the lateral edges of the bumper 200, the recesses do not extend so deep so as to reduce the structural integrity of the foam portion. Any suitable depth of recess 210 may be used depending upon the overall requirements and absolute dimensions of the components.

As described above, the cylindrical cell matrix 214 may be molded or formed in any suitable shape to facilitate insertion into the recesses 210. The cylindrical cell matrix 214 may be retained within the recesses 210 via a press-fit or interference fit. Alternatively, a suitable chemical adhesive may be used to fix the cylindrical cell matrix 214 in place. In an alternate embodiment, the cylindrical cell matrix 214 may be molded with the foam portion 204 during formation of the foam portion. Note as shown in FIG. 10, a front end 220 of the cylindrical cell matrix 214 is flush with the front edge of the foam portion 204, both of which abut the beam 202.

Figure 12A:
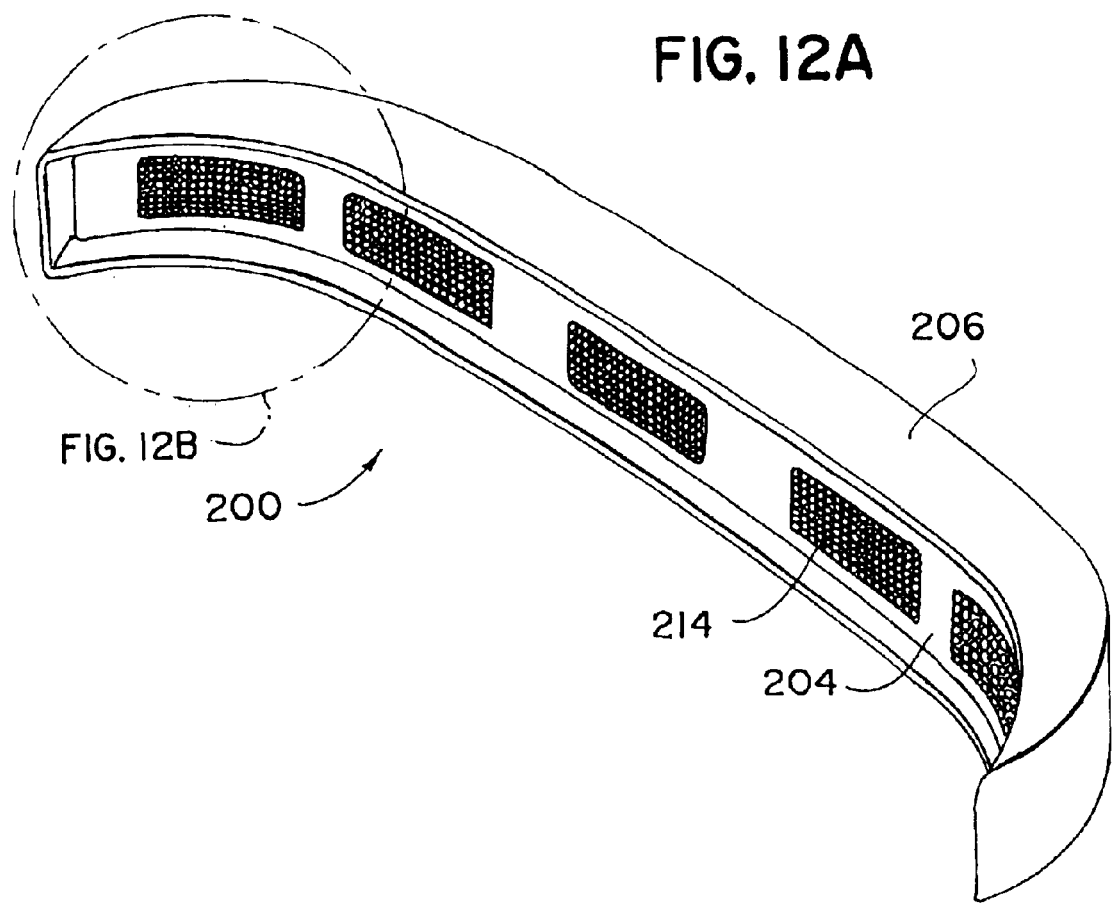
FIG. 12A is a perspective view of a specific embodiment of an energy-absorbing bumper.
Figure 12B:
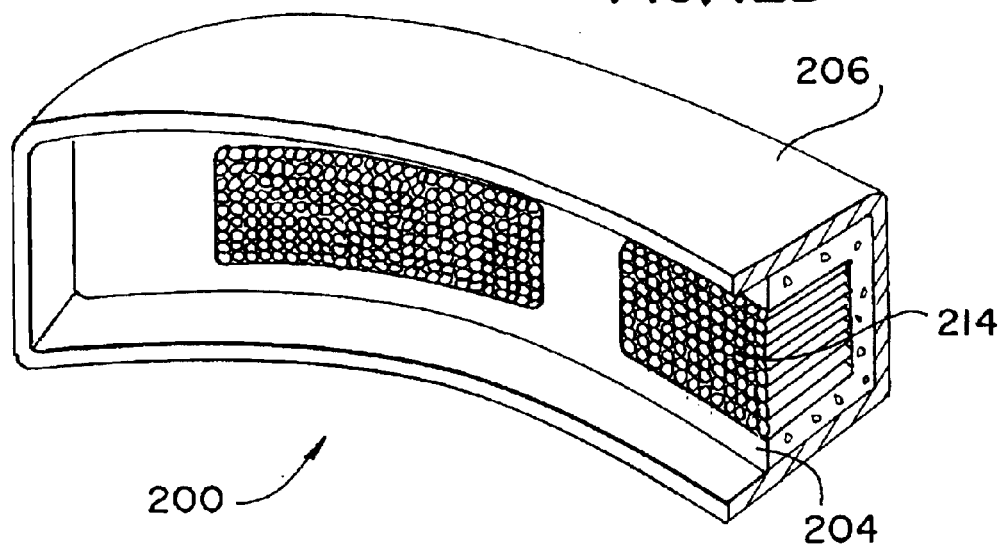
FIG. 12B is a partial sectional view of the energy-absorbing bumper of FIG. 12A.

Referring now to FIGS. 12A and 12B, FIG. 12A shows another view of the bumper system 200, while FIG. 12B shows a partial sectional view. As clearly shown in FIG. 12B, the recesses 210 do not extend through the entire thickness of the foam portion 204.

Figure 13:
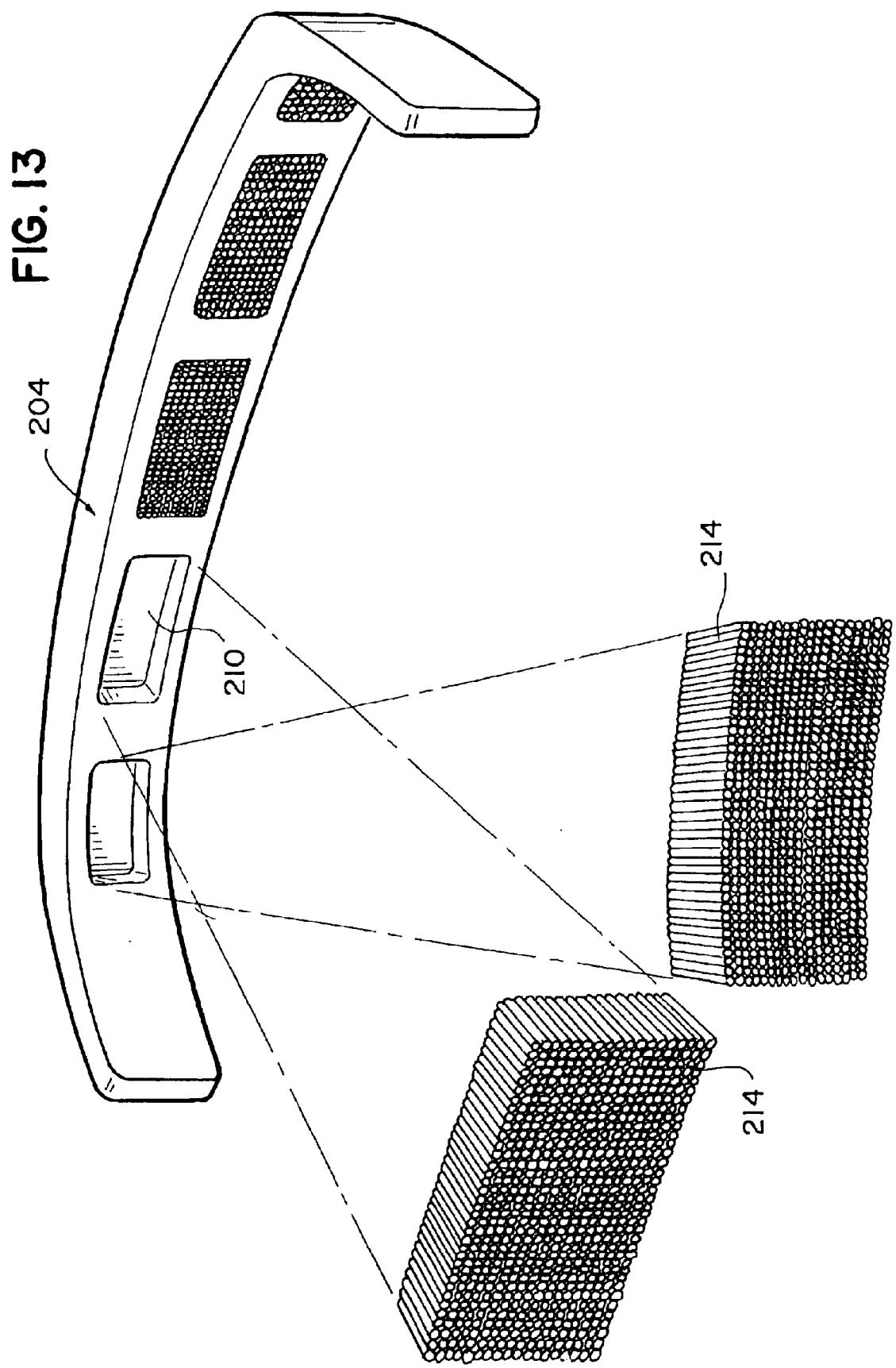
FIG. 13 is a perspective view of a specific embodiment of a foam portion having multiple cylindrical cell matrix components.

Referring now to FIG. 13, FIG. 13 shows a perspective view of a specific embodiment of the foam portion 204 having multiple cylindrical cell matrix components 214. In the illustrated embodiment, four cylindrical cell matrix components 214 are shown, but any suitable number may be used depending upon the size and nature of the application. The fascia 206 (FIG. 10) is not shown for purposes of clarity. Again, the recesses 210 only extend into a portion of the foam portion 204 and do not fully penetrate the form portion.

Figure 14:
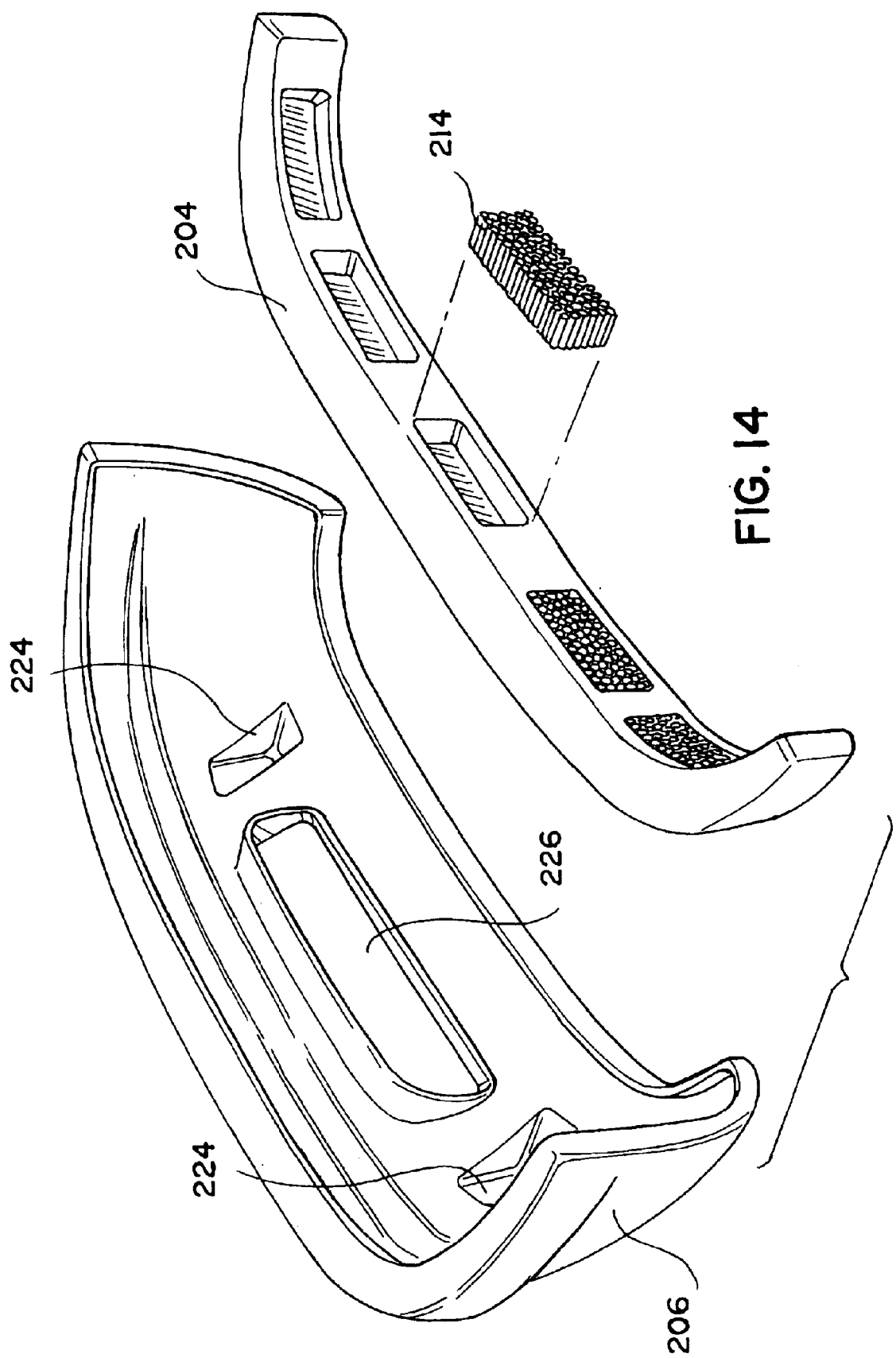
FIG. 14 is a perspective view of the foam portion of FIG. 13 along with a front bumper fascia.

Referring now to FIG. 14, FIG. 14 shows the foam portion 204 of FIG. 13, and further illustrates a specific embodiment including the fascia 206. As shown, the foam portion 204 is part of a front bumper assembly. The fascia 206 includes apertures 224 for fog lamps and an aperture for the grill 226.

Figure 15:
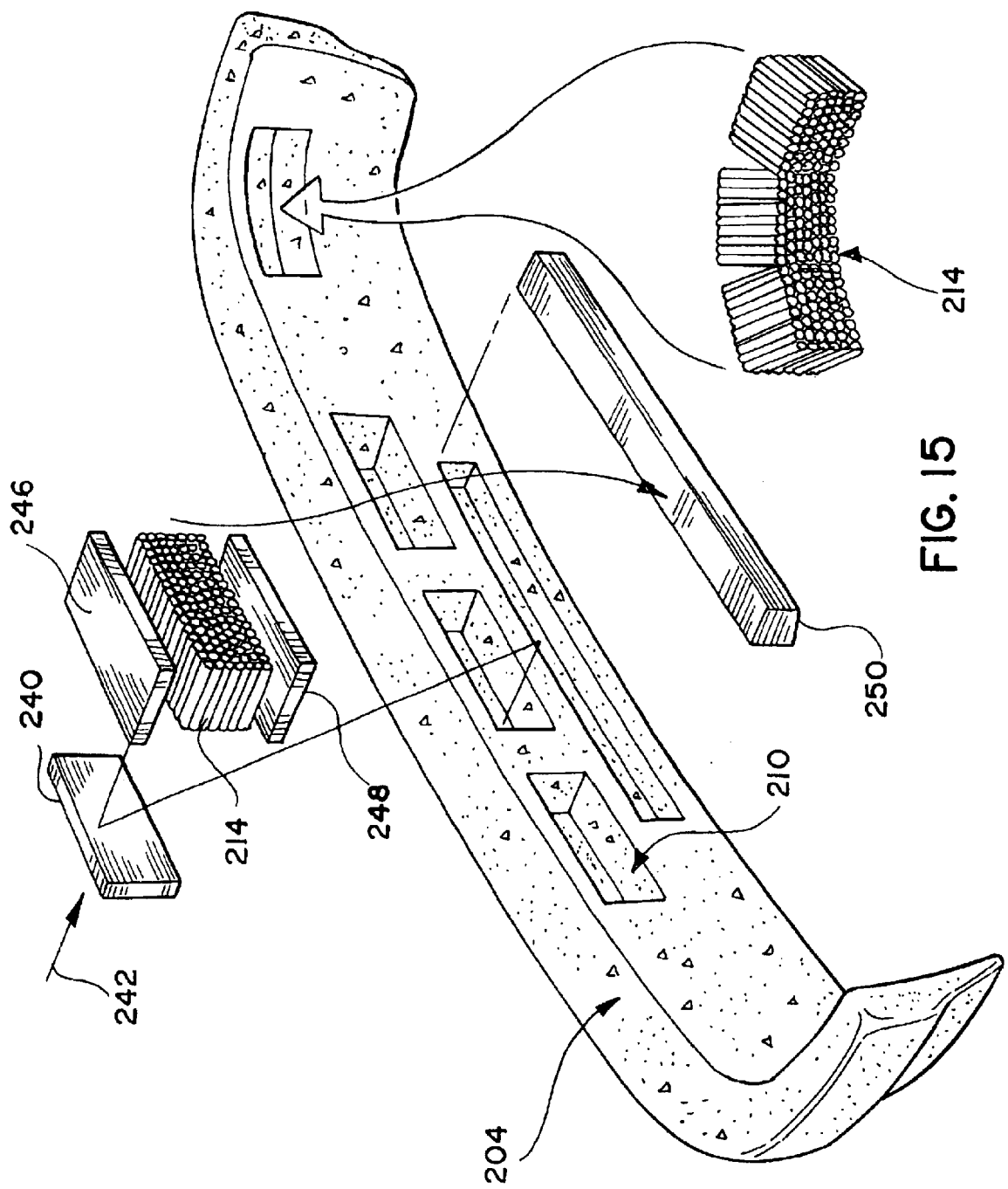
FIG. 15 is a perspective view of a specific embodiment of a foam portion along with a plurality of high density inserts in conjunction with the cylindrical cell matrix components.

Referring now to FIG. 15, a plurality of high-density inserts or panels are shown in conjunction with the cylindrical cell matrix 214. In one embodiment, a high-density panel 240 is disposed in front of the cylindrical cell matrix 214, and is configured to distribute impact force directed against the bumper generally evenly across the cylindrical cell matrix. Note that both the high-density panel 240 and the cylindrical cell matrix 214 are retained within the recesses 210. Because the high-density panel 240 is relatively stiff relative to the low-density foam 204, and because the panel is disposed in front of the matrix 214, an impact in a direction generally shown by an arrow 242 first stresses or impinges the high-density panel 240 (after impinging the fascia and low-density foam). The force, in turn, is transmitted to the cylindrical cell matrix 214.

Because the panel 240 is somewhat stiff, the force, however, is transmitted to the cylindrical cell matrix 214 generally evenly across the surface of the cylindrical cell matrix. This increases the ability of the cylindrical cell matrix 214 to absorb energy. Of course, the energy distribution across the cylindrical cell matrix 214 due to the high-density panel 240 is not exactly even across the entire surface, as the panel must flex and deform under high impact forces. The distribution of force is affected by the magnitude of the force, the location and angle of the application of the force, and the density of the panel 240. Although not necessarily an exactly even distribution, the energy of the impact is distributed generally evenly across the cylindrical cell matrix 214 rather than only at the impact point.

The high-density panel 240, however, need not be placed exactly adjacent to the cylindrical cell matrix 214, and may be spaced apart therefrom by a portion of the low-density foam portion 204. Alternately, the cylindrical cell matrix 214 may be "sandwiched" between a plurality of other high-density panels 246, 248 to increase the structural strength of the bumper, which is also shown in FIG. 15. Alternatively, one or more high-density panels 250 may be used as a stiffener without use of the cylindrical cell matrix 214 to increase the energy absorbing ability of the low-density foam portion 204.

Figure 16:
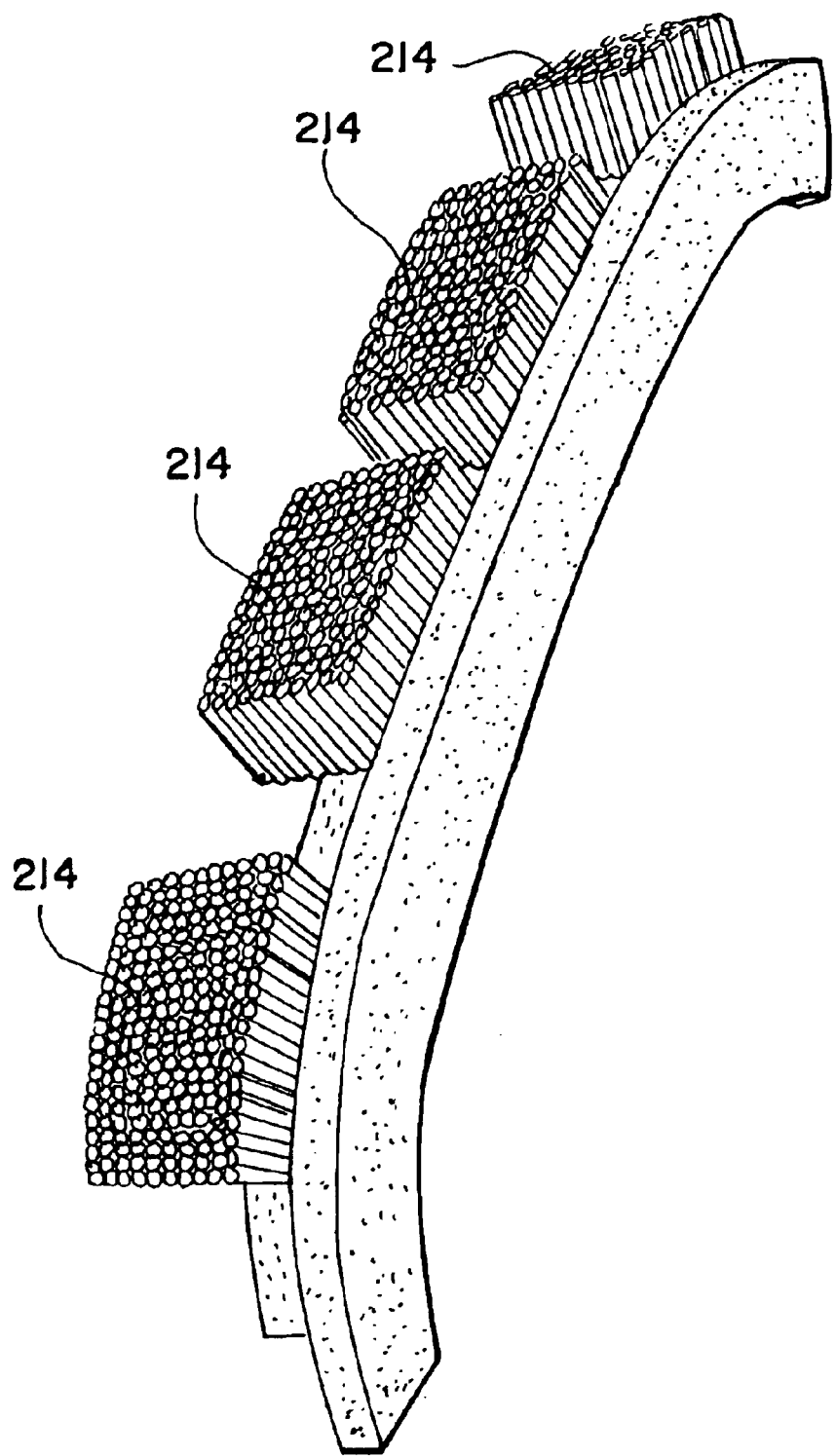
FIG. 16 is a perspective view of a specific embodiment of a foam portion along with a plurality of cylindrical cell matrix components.

Any suitable high-density material may be used. For example, the high-density panels 240, 246, 248, 250 may be formed of high-density foam, high-molecular weight structural foam molding, high-density composite material, polyester sheet-molded material, vinyl-ester sheet-molded material, thermoplastic composite, bulk-molded compound, and high-molecular weight injection molded polyethylene. The density of such material may range from about between 500,000 PSI to 2,000,000 PSI flex modulus Referring now to FIG. 16, a specific embodiment of an arrangement of a plurality of cylindrical cell matrix components 214 are shown. As shown, the matrix components 214 may be affixed to a portion of the foam portion 204, and may be held in place by the fascia (not shown). A minimum amount of foam portion 204 may be used in this embodiment.

Figure 17:
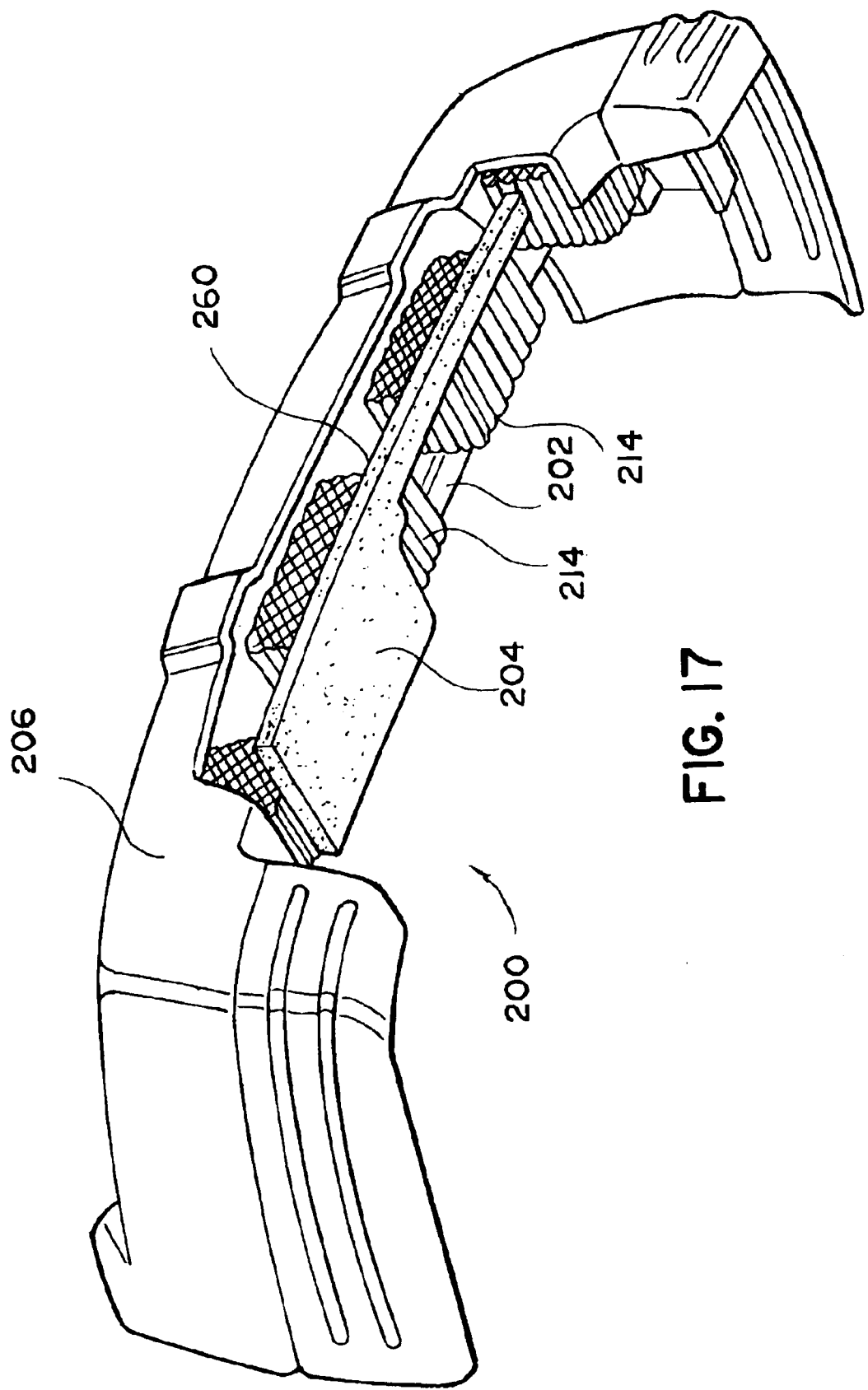
FIG. 17 is a perspective view of a specific embodiment of a bumper system shown preloading of the bumper beam.

Referring now to FIG. 17, a specific embodiment of a bumper system 200 is shown. In this embodiment, a minimum amount of the foam portion 204 is used because the cylindrical cell matrix 214 is sufficient to absorb the energy of an impact. Accordingly, the entire space defined between the bumper beam 202 and the fascia 206 need not be filed by the foam portion 204, as occurs in known bumper systems. In this embodiment, the cylindrical cell matrix 214 is retained by the fascia 206 rather than by the foam portion 204. Alternatively, the foam portion 204 may have a forward section 260 that may protrude or extend forward of the cylindrical cell matrix 214. In such a configuration, the impact first contacts the forward section 260, which absorbs some of the energy of the impact. Because the foam portion 204 is in direct contact with the bumper beam 202, the foam portion essential "loads" the beam 202 prior to absorption of energy by the cylindrical cell matrix 214. Subsequent compression due to the impact then, of course, impacts the cylindrical cell matrix 214.

Figure 18:
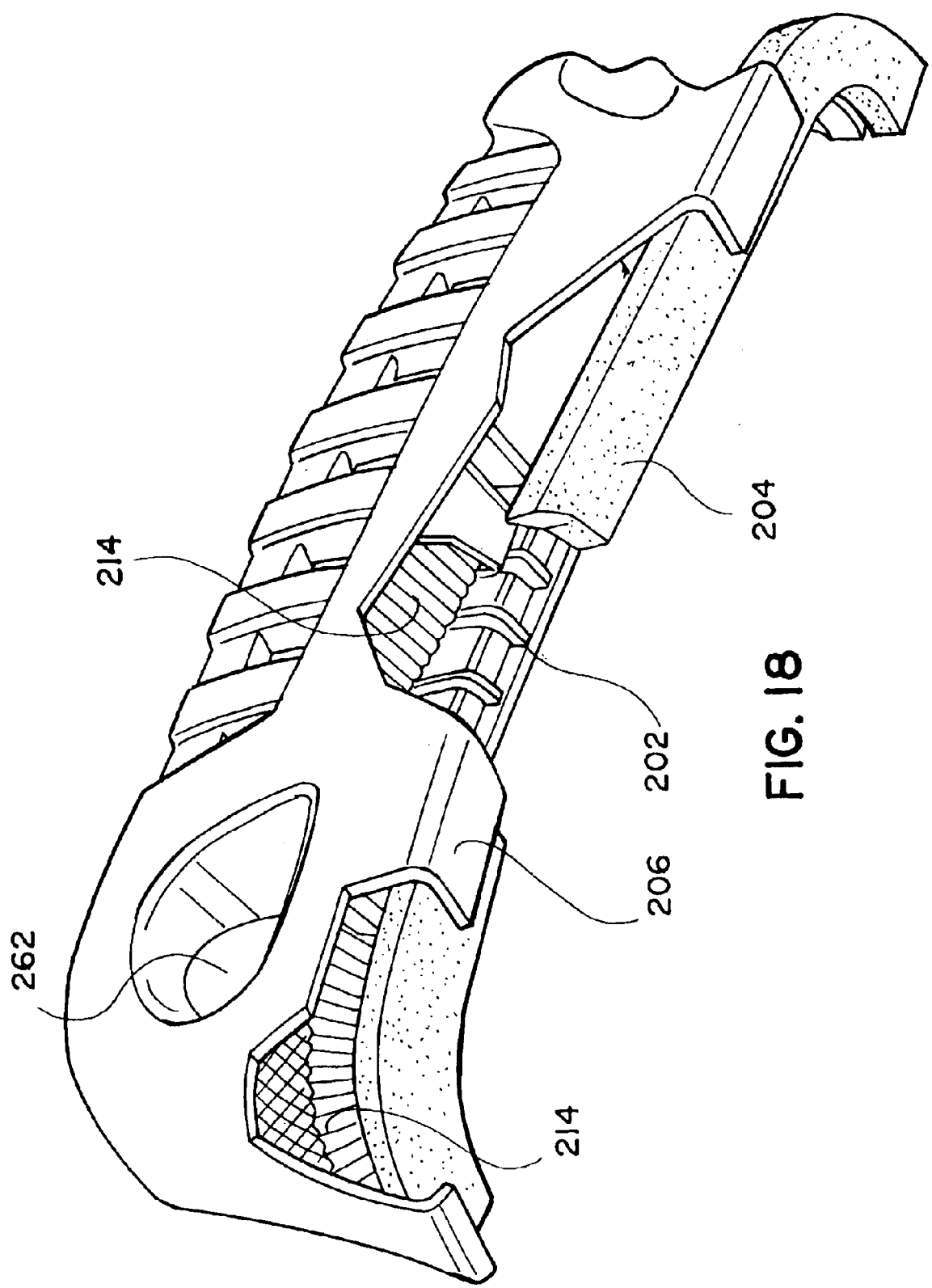
FIG. 18 is a perspective view of a specific embodiment of a bumper system for a front bumper.

Referring now to FIG. 18, a specific embodiment of a bumper system 200 is shown. In this embodiment, the bumper beam may include L-brackets, and the fascia 206 may include apertures 262 for the headlamps. In this embodiment, the use of the foam portion 204 may be minimized with judicious use of the cylindrical cell matrix components 214. The foam 204 may also be high-density foam or high-density composite material, similar to or the same as the high-density material 240, 246, 248 and 250 shown in FIG. 15.

Figure 19:
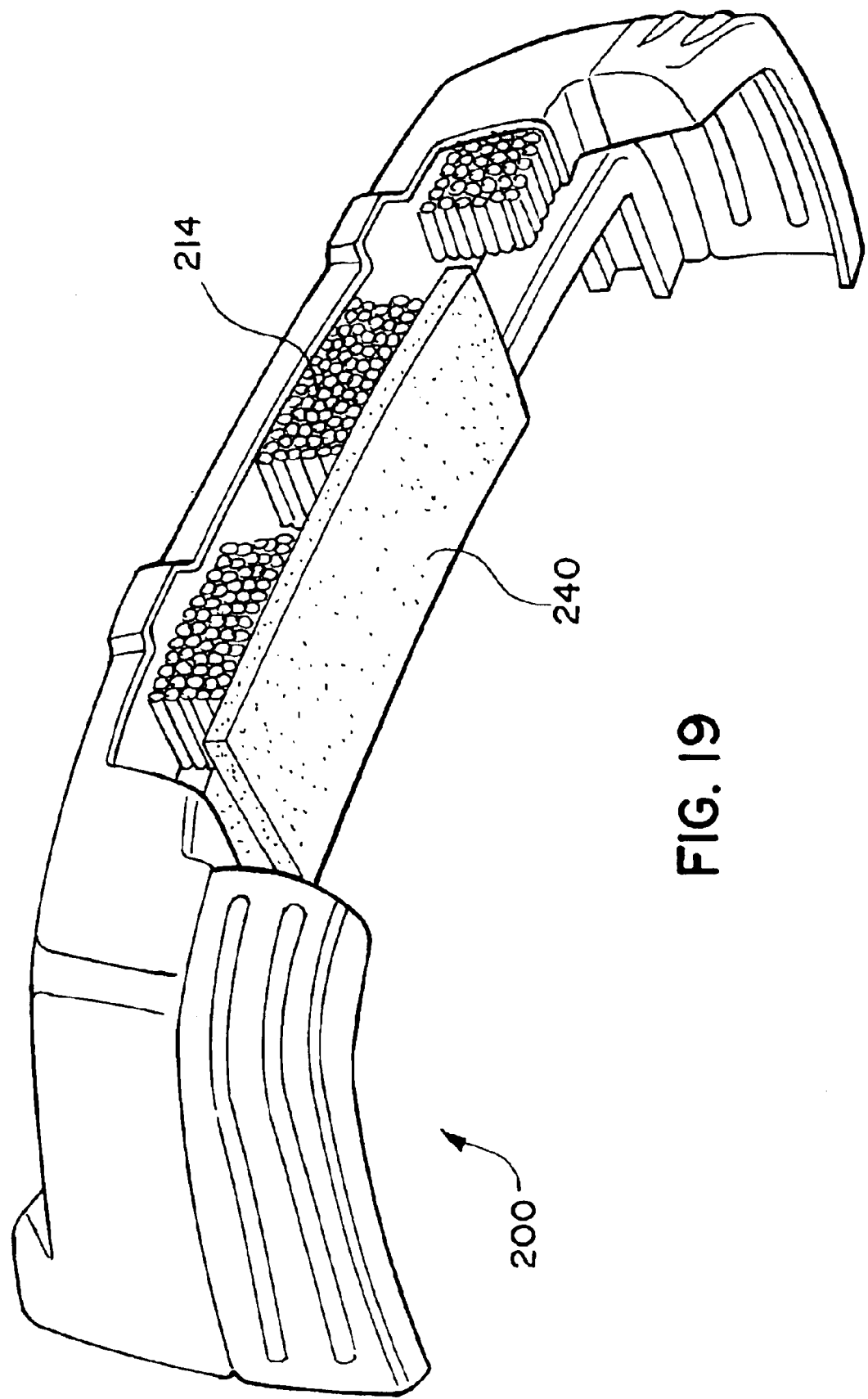
FIG. 19 is a perspective view of a specific embodiment of a bumper system for a front bumper having preloading high-density material.

Referring now to FIG. 19, a specific embodiment of a bumper system 200 is shown. In the illustrated embodiment, the high-density material 240 is shown extending beyond the edge of the cylindrical cell matrix 214 so as to initially absorb a portion of the energy of the impact. This is another example of "pre-loading" the bumper beam 202.

Figure 20:
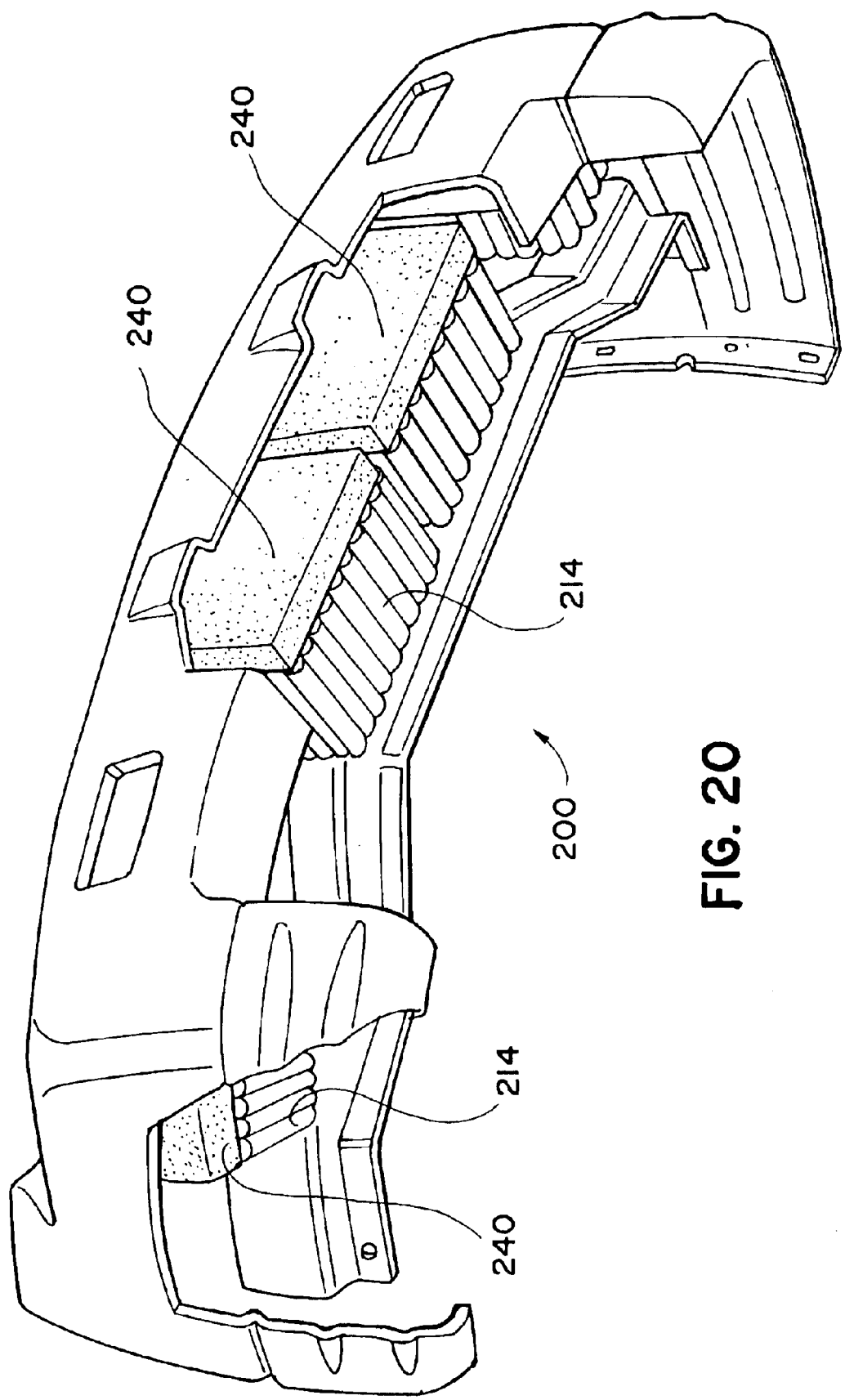
FIG. 20 is a perspective view of a specific embodiment of a bumper system for a front bumper having sectionalized matrix components.

Referring now to FIG. 20, a specific embodiment of a bumper system 200 is shown. In the illustrated embodiment, the cylindrical cell matrix 214 is shown sectionalized or "compartmentalized." Each matrix 214 may have a corresponding portion of high-density material 240 associated therewith.

Figure 21:
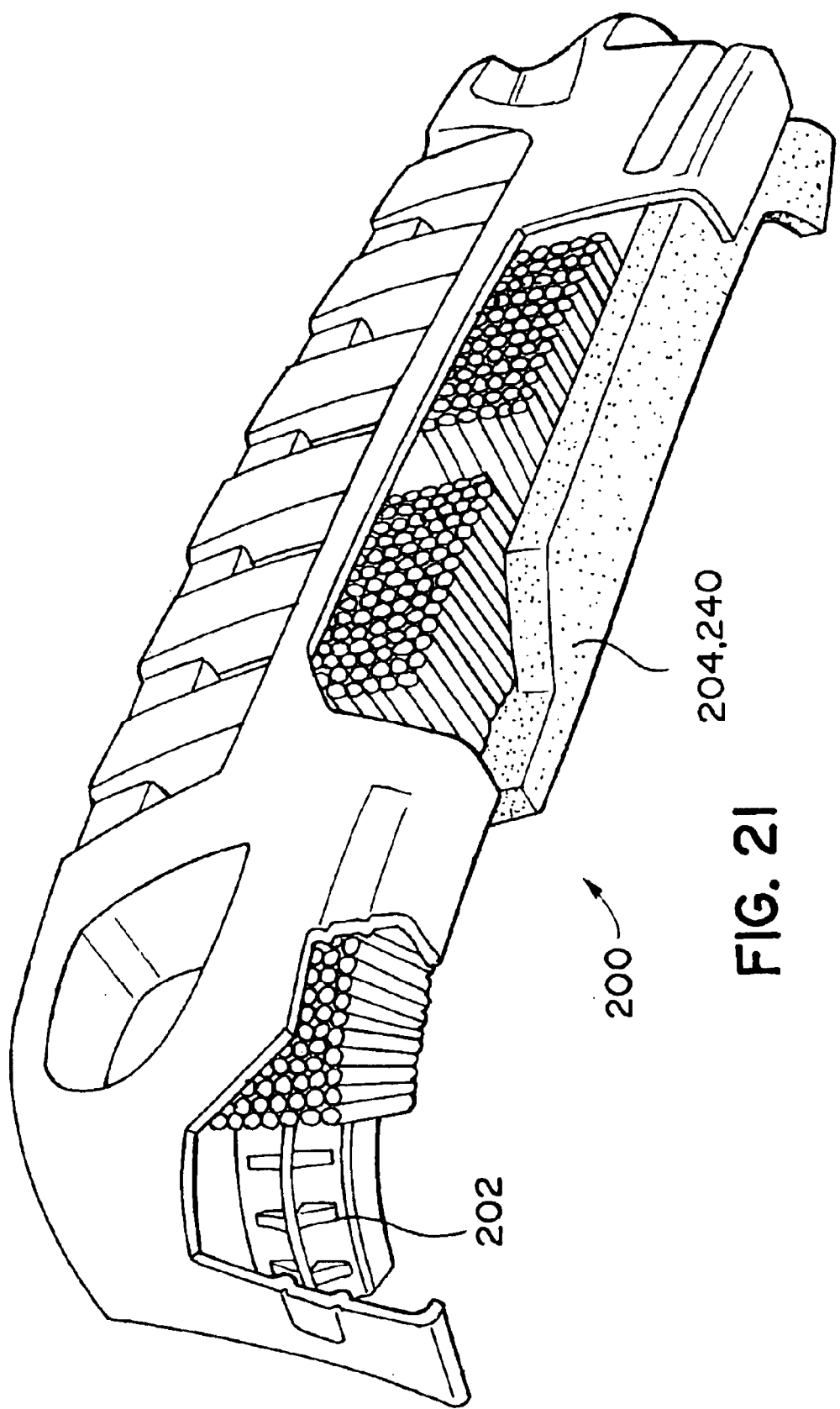
FIG. 21 is a perspective view of a specific embodiment of a bumper system for a front bumper.

Referring now to FIG. 21, a specific embodiment of a bumper system 200 is show having the foam portions 204 placed in selected areas of the bumper 200. Again, the foam portion 204 may also be formed of high-density material 240, as described above, in order to "pre-load" the bumper beam 202.

Figure 22:
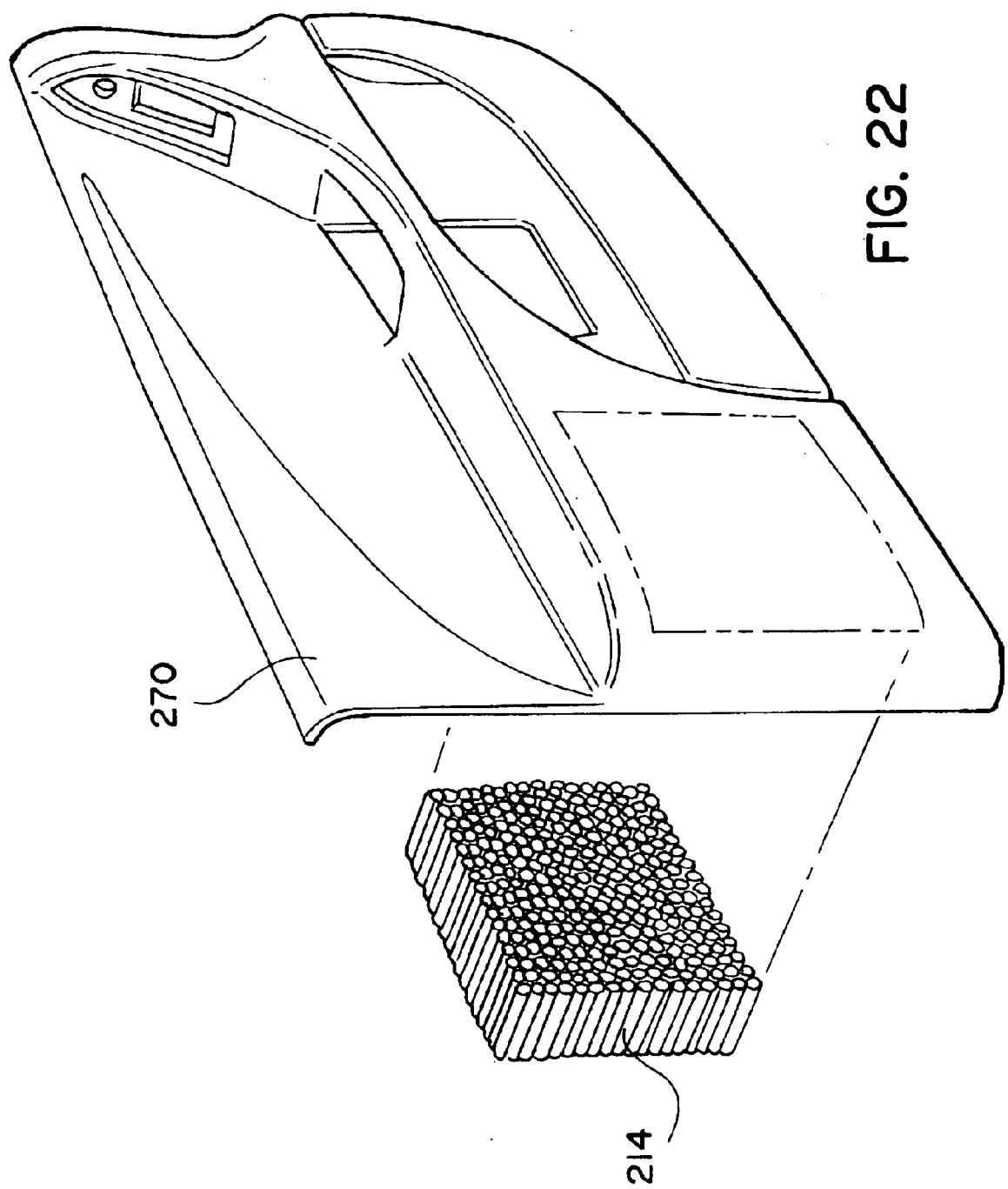
FIG. 22 is a perspective view of a specific embodiment showing use of the cylindrical cell matrix in a door panel.

Referring now to FIG. 22, a specific embodiment of the cylindrical cell matrix 214 is shown inserted into an internal door panel 270. As described above, the cylindrical cell matrix 214 is not limited to use in the exterior components of the vehicle.

Figure 23:
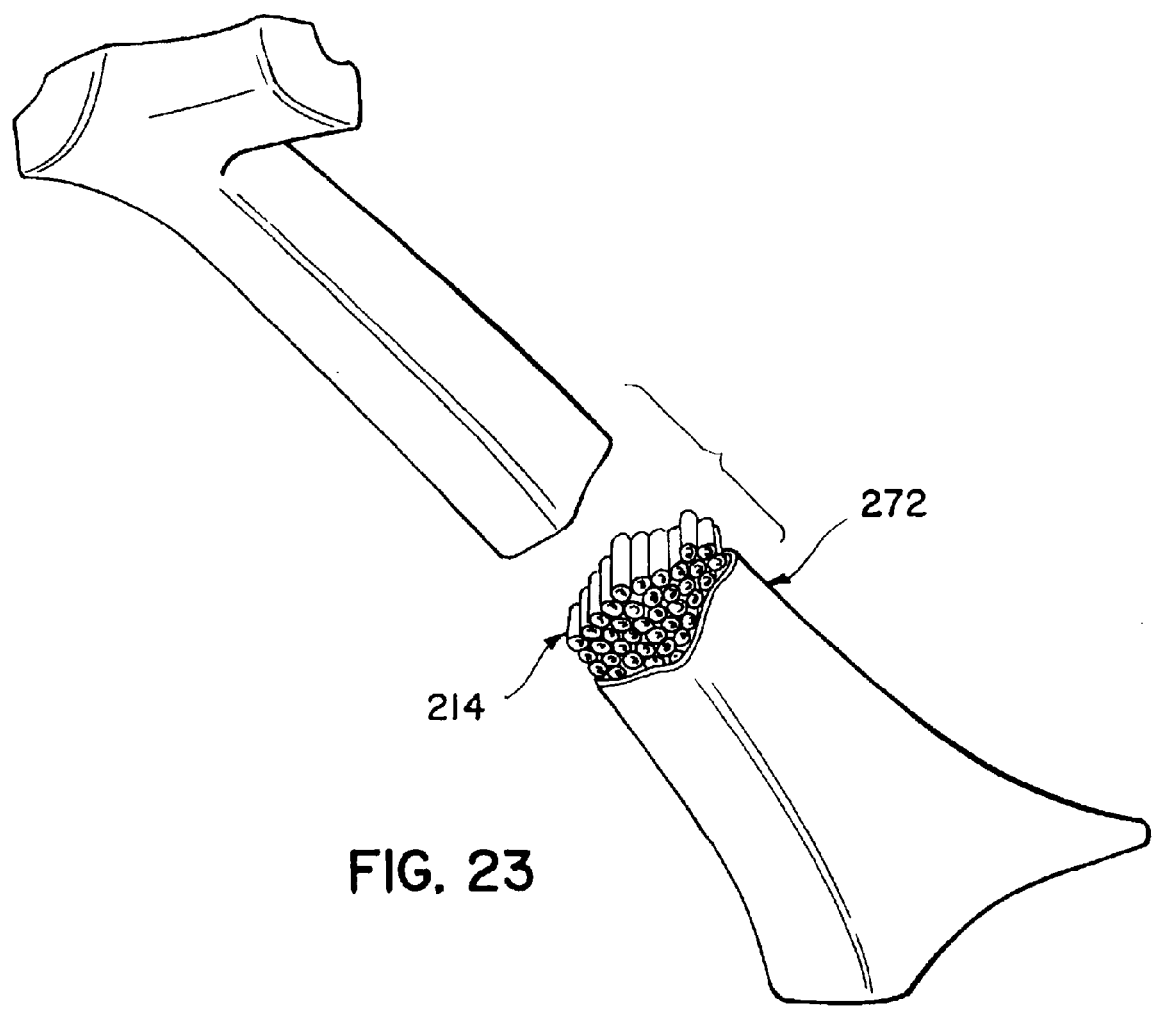
FIG. 23 is a perspective view of a specific embodiment showing use of the cylindrical cell matrix in an A, B, C, or D pillar.

Referring now to FIG. 23, a specific embodiment of the cylindrical cell matrix 214 is shown formed within a vinyl skin 272 for use as an internal component of the vehicle, such as a column. The cylindrical cell matrix 214 may be molded to fit the preexisting dimensional requirements of a variety of components.

Figures 24, 25:
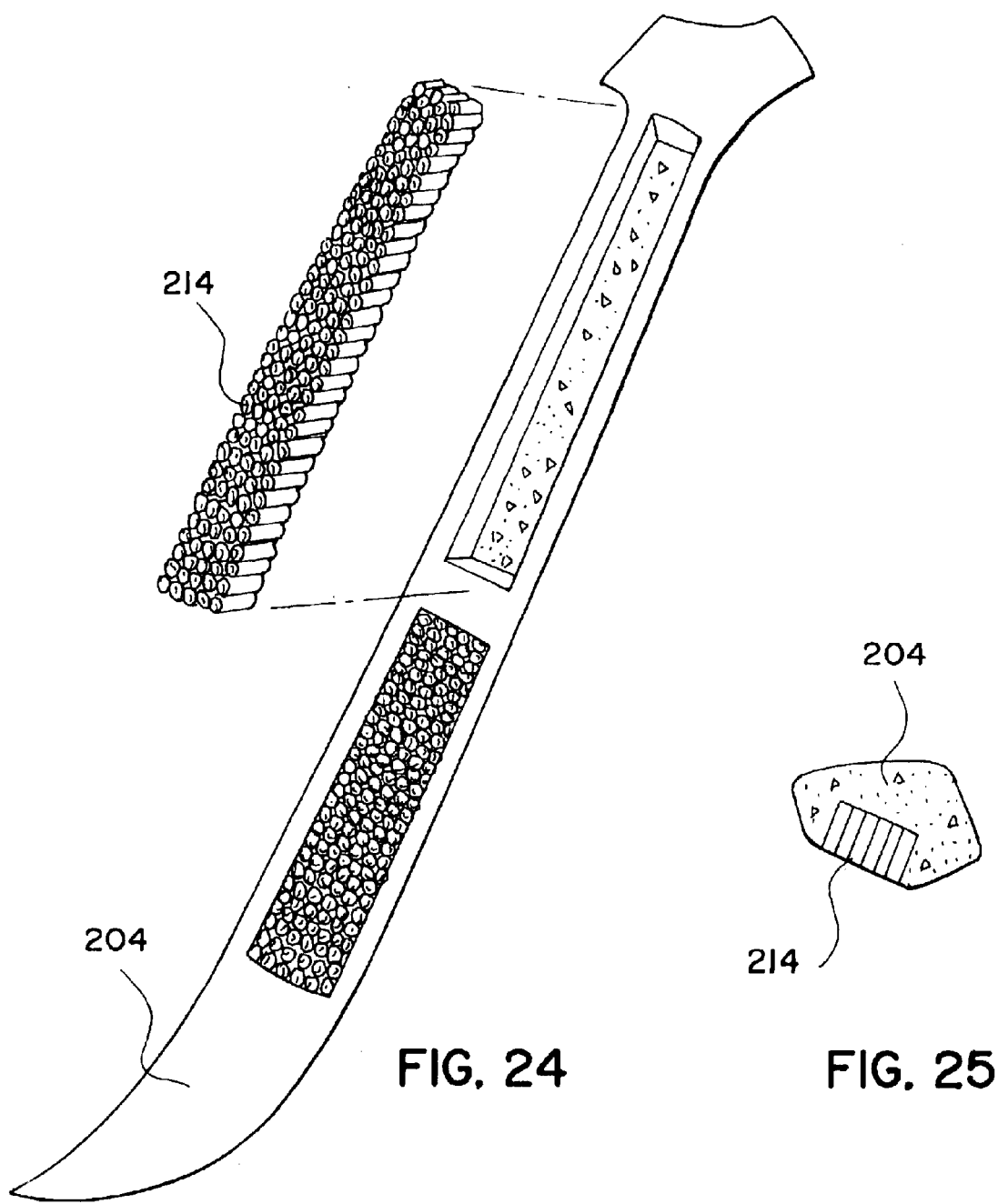
FIG. 24 is a perspective view of a specific embodiment showing use of the cylindrical cell matrix in an interior component of the vehicle.
FIG. 25 is a cross-sectional view of the interior component of FIG. 24.

Referring now to FIG. 24, a specific embodiment of the cylindrical cell matrix 214 is shown inserted into an internal component of the vehicle, such as a column. As best shown in FIG. 25, the cross-section of the foam portion 204 illustrates that the cylindrical cell matrix 214 only extends into the foam portion for a predetermined depth, as described above.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A bumper for mounting on a frame of a vehicle, the bumper comprising:
    an elongated beam configured to be operatively mounted to the frame of the vehicle;
    a foam portion extending along a portion of the beam;
    a fascia surrounding a portion of the foam portion, the fascia and the foam portion operatively attached to the beam;
    the foam portion having a plurality of recesses formed therein, the recesses extending through a predetermined thickness of an inside portion of the foam portion, the recesses abutting a portion of the elongated beam;
    a plurality of non-metallic circular cell matrixes disposed in and supported by at least some, but not all, of the plurality of recesses, and configured to absorb energy resulting from impact force applied to an external portion of the bumper, the cell matrix configured to be removeably replaced upon separation of the foam portion from the beam to expose the recesses thereby allowing removal and replacement of the non-metallic circular cell matrixes through an open end of the exposed recess; and
    a high density panel disposed adjacent at least one of the plurality of non-metallic cell matrixes to preload the elongated beam during a collision.

2. The bumper according to claim 1 wherein the matrix forms an interference fit with the recess.

3. The bumper according to claim 1 wherein the matrix is secured within the recess with chemical adhesive.

4. The bumper according to claim 1 wherein the matrix is sandwiched between a plurality of high-density panels, said matrix and high-density panels retained within the recess.

5. The bumper according to claim 1 wherein the recess extends through the foam for the predetermined distance of about between forty percent to eight-five percent of a thickness of the foam portion.

6. The bumper according to claim 1 wherein the recess extends through the foam portion for the predetermined distance of about between sixty percent to ninety percent of a thickness of the foam portion.

7. The bumper according to claim 1 wherein a front portion of the matrix located proximate the elongated beam is substantially flush with a front portion of the foam portion along an interface defined between the beam and the foam portion.

8. The bumper according to claim 1 wherein the foam portion is formed of low-density foam.

9. The bumper according to claim 8 wherein the low-density foam has a density of about between two pounds per cubic foot and eight pounds per cubit foot.

10. The bumper according to claim 1, wherein the high-density panel is disposed in front of the matrix and configured to distribute impact force directed against the bumper across a portion of the matrix.

11. The bumper according to claim 10 wherein the high-density panel is selected from the group consisting of high-density foam, high-molecular weight structural foam molding, high-density composite material, polyester sheet-molded material, vinyl-ester sheet-molded material, thermoplastic composite, bulk-molded compound, and high-molecular weight injection molded polyethylene.

12. A bumper for mounting on a frame of a vehicle, the bumper comprising:

an elongated beam configured to be operatively mounted to the frame of the vehicle;

a foam portion extending along a portion of the beam;

a fascia surrounding a portion of the foam portion, the fascia and the foam portion operatively attached to the beam;

the foam portion having a plurality of recesses formed therein, the recesses extending through a predetermined thickness of an inside portion of the foam portion, the recesses abutting the elongated beam;

a plurality of non-metallic integrated cylindrical cell matrixes disposed within at least some, but not all, of the recesses, the cell matrixes formed of a plurality of circular cells having a longitudinal axis, the cell matrixes configured to be releasably removed from the recesses upon separation of the foam portion from the beam to expose the recesses;

the matrix configured to absorb energy resulting from impact force applied to an external portion of the bumper in a direction generally along the longitudinal axis; and a high density panel disposed adjacent at least one of the plurality of non-metallic cell matrixes to preload the elongated beam during a collision.

13. The bumper according to claim 12 wherein the matrix forms an interference fit with the recess.

14. The bumper according to claim 12 wherein the matrix is secured within the recess with chemical adhesive.

15. The bumper according to claim 12 wherein the recess extends through the foam for the predetermined distance of about between forty percent to eight-five percent of a thickness of the foam portion.

16. The bumper according to claim 12 wherein the recess extends through the foam portion for the predetermined distance of about between sixty percent to ninety percent of a thickness of the foam portion.

17. The bumper according to claim 12 wherein a front portion of the matrix located proximate the elongated beam is substantially flush with a front portion of the foam portion along an interface defined between the beam and the foam portion.

18. The bumper according to claim 12 wherein the foam portion is formed of low-density foam.

19. The bumper according to claim 12 wherein the low-density foam has a density of about between two pounds per cubic foot and eight pounds per cubit foot.

* * * * *